(12) United States Patent
Mukhija

(10) Patent No.: US 8,706,025 B2
(45) Date of Patent: Apr. 22, 2014

(54) LINK PERFORMANCE DIFFERENCE METRICS AND LINK ADAPTATION FOR MESH SATELLITE NETWORKS

(75) Inventor: Punit Mukhija, Clarksburg, MD (US)

(73) Assignee: ViaSat, Inc., Carlsbad, CA (US)

(*) Notice: Subject to any disclaimer, the term of this patent is extended or adjusted under 35 U.S.C. 154(b) by 805 days.

(21) Appl. No.: 12/815,597

(22) Filed: Jun. 15, 2010

(65) Prior Publication Data

US 2011/0143654 A1 Jun. 16, 2011

Related U.S. Application Data

(60) Provisional application No. 61/187,146, filed on Jun. 15, 2009.

(51) Int. Cl.
*H04B 1/60* (2006.01)
*H04B 17/02* (2006.01)

(52) U.S. Cl.
USPC ............ 455/9; 455/3.02; 455/12.1; 455/40; 455/135; 455/427; 370/316

(58) Field of Classification Search
USPC ............ 455/9, 3.02, 7, 21.1, 40, 67.13, 135, 455/161.3, 244.2, 427, 452.2, 453, 12.1; 370/316, 317, 332; 375/130
See application file for complete search history.

(56) References Cited

U.S. PATENT DOCUMENTS

| | | | |
|---|---|---|---|
| 6,240,124 B1 | 5/2001 | Wiedeman et al. | |
| 2003/0013409 A1 | 1/2003 | Buckshaw | |
| 2008/0144713 A1* | 6/2008 | Kimmich et al. | 375/240.02 |
| 2008/0212517 A1* | 9/2008 | Thesling | 370/316 |
| 2008/0268788 A1 | 10/2008 | Bruas | |

FOREIGN PATENT DOCUMENTS

EP 0954117 A1 11/1999

OTHER PUBLICATIONS

King, Jan A., Everything You Ever Wanted to Know About Spacecraft Link Budgets . . . But Were Afraid to Ask, *AMSAT*, Jul. 2005.
PCT International Search Report and Written Opinion mailed Nov. 29, 2010; International Application No. PCT/US2010/038671; 9 pages.

* cited by examiner

*Primary Examiner* — Shaima Q Aminzay
(74) *Attorney, Agent, or Firm* — Kilpatrick Townsend & Stockton LLP

(57) ABSTRACT

Systems, devices, and methods are disclosed for determining link performance metrics for satellite communication terminals. Using link performance metrics and link performance difference metrics, signal modulation and coding may be decided. Link performance metrics may be determined for individual terminal uplinks and downlinks. Fixed and dynamic link adaptation mechanisms are also disclosed that utilize link performance metrics and link performance difference metrics determined under clear sky and dynamic conditions.

24 Claims, 16 Drawing Sheets

LINK PERFORMANCE DIFFERENCE METRICS AND LINK ADAPTATION FOR MESH SATELLITE NETWORKS

CROSS-REFERENCES TO RELATED APPLICATIONS

This application is a non-provisional patent application claiming priority benefit of U.S. provisional patent application Ser. No. 61/187,146, filed on Jun. 15, 2009 and entitled "Fixed and Dynamic Link Adaptation For Mesh Satellite Networks," the entire disclosure of which is herein incorporated by reference for all purposes.

BACKGROUND

To determine a link budget in a satellite communication system, there is typically an accounting for gains and losses from the transmitter, through the medium (e.g., the satellite communication link or links), and to the receiver in the system. A link budget, therefore, may account for performance of particular links, including the attenuation of the transmitted signal due to propagation and other miscellaneous gains and losses. Link performance may also be impacted by hardware in the system and the antenna gains at particular terminals. Time varying channel conditions, such as rain factors, may impact link performance as well. Randomly varying channel gains such as fading may be taken into account by adding some margin depending on the anticipated severity of its effects. The link performance of individual links are often characterized by the terminal's carrier-to-noise ratio ("C/N"). Link conditions may be determined for both uplinks and downlinks between terminals and a satellite.

Satellite communication systems may benefit from adapting signal characteristics (e.g., the modulation and coding of signals ("modcodes")). The modcodes may be adapted on a per-terminal basis to better match the link conditions for each terminal in a multi-terminal system. For example, higher order modulation and higher code rate may allow more information to be transmitted over a given time, while lower order modulation and lower code rate may be more reliable but require more time to transmit the same size message.

Typically, to determine link performance, a return channel or other means may be used to report the conditions of a receiving terminal. This method may involve first setting up a link to the receiving terminal through a satellite. It may be beneficial to identify novel systems, devices, and methods to efficiently determine link performance for different links in a multi-terminal satellite system.

BRIEF SUMMARY

Various embodiments of the invention provide methods, systems, and devices for determining link performance information for various satellite links. Link performance information may be used to determine link budgets and link margins, and make modulation and coding ("modcode") decisions for satellite communications. In some embodiments, this may be done before communication is established between the terminals. Modcodes may be optimized for these satellite communication links. Various embodiments may take advantage of communication systems that include a reference terminal that communicates with the other terminals. Utilizing relationships between terminals and a reference terminal may reduce the amount of traffic required to determine link performance.

In some embodiments, a link performance difference metric may be generated that reflects certain performance differences between a terminal and a reference terminal based on the difference in beam strength, system temperature, antenna gain and/or other equipment such as low noise amplifier (LNA) at a terminal relative to a beam strength, system temperature, antenna gain and/or certain other equipment such as LNA at a reference terminal. Embodiments may also utilize existing signal information transmitted between a reference terminal and the other terminals to determine link performance difference metrics. In some embodiments, a link performance difference metric may be represented by a difference between the carrier-to-noise ratio for a terminal on the downlink from the satellite relative to the carrier-to-noise ratio for a reference terminal on the same downlink; this may be referred to as a delta carrier-to-noise ratio parameter.

In some embodiments, a link performance difference metric may be used to determine a measure of an individual and/or total link performance between terminals. A link performance difference metric may be used to determine link budgets and link margins in some embodiments. These link performance difference metrics may also be utilized to help determine and/or optimize modcodes for signals between terminals.

In some embodiments, a satellite communication system configured to determine link information between various terminals in a satellite communication system is provided. The system may include multiple terminals. The system may include a control center in communication with at least a subset of the terminals. The control center may be configured to identify a first link performance metric for a first terminal from the plurality of terminals. The control center may be configured to identify a second link performance metric for a reference terminal from the plurality of terminals. The control center may be configured to identify a third link performance metric between the satellite and a second terminal from the plurality of terminals. The control center may be configured to determine a difference between the first and second link performance metrics. The control center may be configured to calculate a link performance metric between the first terminal and the second terminal utilizing the third link performance metric and the determined difference between the first and second link performance metrics.

Some embodiments of the satellite communication system configured to determine link information between terminals in a satellite communication system may include the control center configured to calculate the link performance metric between the first terminal and second terminal occurs before a communication link is established between the first terminal and the second terminal. In some embodiments, the control center is further configured to determine at least a modulation or a coding scheme for a signal sent between the first terminal and the second terminal utilizing the calculated link performance metric.

Some embodiments of the satellite communication system configured to determine link information between terminals in a satellite communication system may include the control center configured to identify at least one of the link performance metrics identifying at least one characteristic of the respective terminal. In some embodiments, the control center may be configured to identify at least one characteristic of the respective terminal identifying at least a hardware component such as an LNA, an antenna gain, system temperature, and/or a beam strength for the respective terminal. In some embodiments, the control center may be configured to identify at least one of the link performance metrics identifying a signal-to-noise ratio between the satellite and the respective terminal. In some embodiments, the control center may be configured to identify the signal-to-noise ratio between the satellite and the respective terminal identifying at least a carrier-to-noise ratio, a bit error rate, or an energy-per-bit-to-noise ratio. The control center may be configured to identify the carrier-to-noise ratio, the signal-to-noise ratio, the bit error rate, and/or the energy-per-bit-to-noise ratio between the satellite and the respective terminal further utilizing a reference burst sent from the reference terminal and received at the respective terminal. The control center may be configured to identify the carrier-to-noise ratio, the signal-to-noise ratio, the bit error rate, or the energy-per-bit-to-noise ratio between the satellite and the respective terminal further utilizing at signal burst sent from the first terminal and received at the respective terminal.

Some embodiments of the satellite communication system configured to determine link information between terminals in a satellite communication system may include the control center configured to calculate the link performance metric comprises calculating a terminal-to-terminal performance metric between the first terminal and the second terminal via the satellite. In some embodiments, the control center configured to identify at least one link performance metric comprises identifying a downlink performance metric.

In some embodiments, a method for determining link information between terminals in a satellite communication network is provided. The method may include identifying a first link performance metric for a first terminal in the satellite communication network. The method may include identifying a second link performance metric for a reference terminal in the satellite communication network. The method may include identifying a third link performance metric between the satellite and a second terminal. The method may include determining a difference between the first and second link performance metrics. The method may include calculating a link performance metric between the first terminal and the second terminal utilizing the third link performance metric and the determined difference between the first and second link performance metrics.

Some embodiments of the method for determining link information between terminals in a satellite communication network may include calculating the link performance metric between the first terminal and second terminal occurs before a communication link is established between the first terminal and the second terminal. Some embodiments of the method for determining link information between terminals in a satellite communication network may include determining at least a modulation or a coding for a signal sent between the first terminal and the second terminal utilizing the calculated link performance metric.

In some embodiments, a satellite communication device configured for determining link information between terminals in a satellite communication network is provided. The device may include a receiver configured to receive link performance metrics for a plurality of terminals in the satellite communication network. The device may include a processor. The processor may be configured to identify a first link performance metric for a first terminal in the satellite communication network. The processor may be configured to identify a second link performance metric for a reference terminal in the satellite communication network. The processor may be configured to identify a third link performance metric between the satellite and a second terminal. The processor may be configured to determine a difference between the first and second link performance metrics. The processor may be configured to calculate a link performance metric between the first terminal and the second terminal utilizing the third link performance metric and the determined difference between first and second link performance metrics. The device may include a transmitter configured to transmit information regarding link performance metrics in the satellite communication network.

Some embodiments of the satellite communication device configured for determining link information between terminals in a satellite communication network may include a processor configured to calculate the link performance metric between the first terminal and second terminal occurs before a communication link is established between the first terminal and the second terminal. In some embodiments, the processor is further configured to determine at least a modulation or a coding for a signal sent between the first terminal and the second terminal utilizing the calculated link performance metric.

Certain embodiments may utilize a fixed link adaptation mechanism. Fixed link adaptation may be utilized to determine individual uplink and downlink measures of performance for terminals, including reference terminals. A fixed link adaptation mechanism may involve transmitting a series of bursts between a reference terminal and a terminal to determine individual uplink and downlink measures of performance, including but not limited to an uplink and downlink carrier-to-noise ratio for terminals. Fixed link adaptation may also utilize link performance difference metrics to determine individual uplink and downlink measures of performance. Modcodes may be determined and/or optimized based on the performance link information determined through fixed link adaptation. Fixed link adaptation may be determined under clear sky conditions. Dynamic conditions, such as rain fade, may also be taken into account utilizing margins. Fixed link adaptation may be done manually and/or automatically.

Certain embodiments may utilize a dynamic link adaptation mechanism. Dynamic link adaptation may be built upon fixed link adaptation. Dynamic link adaptation may account for dynamic/time-varying factors, such as rain fade factors, for uplinks and downlinks for terminals, including reference terminals. Dynamic link adaptation may utilize communications bursts transmitted by terminals, including reference terminals. Merely by way of example, a reference terminal may transmit reference bursts to the terminals including the reference terminal itself. Terminals may transmit control bursts and/or signal bursts to the other terminals, including the reference terminal and the transmitting terminals themselves. These bursts may be used in different embodiments to provide link performance measures for the terminals under dynamic conditions, such as rain conditions. Rain fade factors may thus be determined. Using dynamic condition factors along with fixed link adaptation and link performance difference metrics, individual and total link performances may be calculated for links between two terminals. In some embodiments, these performance measures may be calculated even though the terminals may not have an established communication link. Modcodes may be decided and/or optimized based on the calculated measures of link performance for transmissions between terminals in some embodiments.

In some embodiments, a satellite communication system configured to determine link performance metrics for terminals in a satellite communication system is provided. The system may include multiple terminals. The system may include a control center in communication with at least a subset of the terminals. The control center may be configured to identify a first round trip link performance metric from a first terminal to the first terminal via a satellite. The control center may be configured to identify a second round trip link performance metric from a reference terminal to the reference terminal via the satellite. The control center may be configured to identify a first one way performance metric from the first terminal to the reference terminal via the satellite. The control center may be configured to identify a second one-way link performance metric from the reference terminal to the first terminal via the satellite. The control center may be configured to determine a first difference between a known link performance metric for the first terminal and a known link performance metric for the reference terminal. The control center may be configured to calculate at least one terminal-to-satellite performance metric utilizing the plurality of identified round trip link performance metrics, the plurality of identified one-way link performance metrics, and the determined first difference.

Some embodiments of the satellite communication system configured to determine link performance metrics for terminals in a satellite communication system may include a control center configured to identify at least one of the link performance metrics using at least one communication burst that is part of regular communication between terminals. The control center may be configured to use the at least one communication burst that is part of regular communication between terminals including using at least a reference burst from the reference terminal, a control burst from the first terminal, or a signal burst from the first terminal.

Some embodiments of the satellite communication system configured to determine link performance metrics for terminals in a satellite communication system may include a control center that is further configured to determine at least a modulation or a coding for a signal sent from at least one of the terminals based on at least one of the terminal-to-satellite performance metrics.

Some embodiments of the satellite communication system configured to determine link performance metrics for terminals in a satellite communication system may include a control center that is further configured to determine a second difference between a known link performance metric for a second terminal and a known link performance metric for the reference terminal. The control center may calculate a third one-way link performance metric from the first terminal to the second terminal via the satellite using a plurality of terminal-to-satellite performance metrics and the second determined difference.

Some embodiments of the satellite communication system configured to determine link performance metrics for terminals in a satellite communication system may include the control center configured to calculate at least an uplink performance metric for the first terminal, an uplink performance metric for the reference terminal, a downlink performance metric for the first terminal, or a downlink performance metric for the reference terminal. The control center configured to identify the plurality of link performance metrics occurs under clear sky conditions.

Some embodiments of the satellite communication system configured to determine link performance metrics for terminals in a satellite communication system may include the control center further configured to identify a third one-way link performance metric from the reference terminal to the reference terminal via the satellite under dynamic conditions. The control center may be configured to calculate a first dynamic link factor for the reference terminal based on the identified third round trip link performance metric and the plurality of link performance metrics determined under clear sky conditions.

Some embodiments of the satellite communication system configured to determine link performance metrics for terminals in a satellite communication system may include the control center further configured to identify a fourth one-way link performance metric from the first terminal to the reference terminal via the satellite under dynamic conditions. The control center may be configured to calculate a second dynamic link factor for the first terminal based on the identified fourth one-way link performance metric and the plurality of link performance metrics identified under clear sky conditions.

Some embodiments of the satellite communication system configured to determine link performance metrics for terminals in a satellite communication system may include the control center further configured to identify a fifth one-way link performance metric from a second terminal to the reference terminal via the satellite under clear sky conditions. The control center may be configured to identify a sixth one-way link performance metric from the reference terminal to the second terminal via the satellite under clear sky conditions. The control center may be configured to identify a seventh one-way link performance metric from the second terminal to the reference terminal via the satellite under dynamic conditions. The control center may be configured to determine a second difference between a known link performance metric for the second terminal and a known link performance metric for the reference terminal. The control center may be configured to calculate at least one terminal-to-satellite performance metric utilizing the plurality of identified round trip link performance metrics, the plurality of identified one-way link performance metrics, and the determined second difference. The control center may be configured to calculate a third dynamic link factor for the second terminal based on the identified third one-way link performance metric and the plurality of link performance metrics determined under clear sky conditions. The control center may be configured to calculate a third round trip link performance metric between the first terminal and the second terminal utilizing the plurality of dynamic link factors.

Some embodiments of the satellite communication system configured to determine link performance metrics for terminals in a satellite communication system may include the control center further configured to determine at least a modulation or a coding for a signal sent from the first terminal to the second terminal utilizing the third round trip link performance metric. The control center may be configured to calculate at least one of the dynamic link factors including calculating a rain fade factor.

In some embodiments, a satellite communication device configured to determine link performance metrics for terminals in a satellite communication network is provided. The device may include a receiver configured to receive link performance metrics for multiple terminals in the satellite communication network. The device may include a processor. The processor may be configured to identify a first round trip link performance metric from a first terminal to the first terminal via a satellite. The processor may be configured to identify a second round trip link performance metric from a reference terminal to the reference terminal via the satellite. The processor may be configured to identify a first one way performance metric from the first terminal to the reference terminal via the satellite. The processor may be configured to identify a second one-way link performance metric from the reference terminal to the first terminal via the satellite. The processor may be configured to determine a first difference between a known link performance metric for the first terminal and a known link performance metric for the reference terminal. The processor may be configured to calculate at least one terminal-to-satellite performance metric utilizing the plurality of identified round trip link performance metrics, the plurality of identified one-way link performance metrics, and the determined first difference. The device may include a transmitter configured to transmit information regarding link performance metrics into the satellite communication network.

Some embodiments of the satellite communication device configured to determine link performance metrics for terminals in a satellite communication network may include the processor configured to identify at least one link performance metric using at least one communication burst that is part of regular communication between terminals.

Some embodiments of the satellite communication device configured to determine link performance metrics for terminals in a satellite communication network may include the processor configured to determine at least a modulation or a coding for a signal sent from at least one of the terminals based on at least one of the terminal-to-satellite performance metrics.

In some embodiments, a method for determining link performance metrics for terminals in a satellite communication network is provided. The method may include identifying a first round trip link performance metric from a first terminal to the first terminal via a satellite. The method may include identifying a second round trip link performance metric from a reference terminal to the reference terminal via the satellite. The method may include identifying a first one way performance metric from the first terminal to the reference terminal via the satellite. The method may include identifying a second one-way link performance metric from the reference terminal to the first terminal via the satellite. The method may include determining a first difference between a known link performance metric for the first terminal and a known link performance metric for the reference terminal. The method may include calculating at least one terminal-to-satellite performance metric utilizing the plurality of identified round trip link performance metrics, the plurality of identified one-way link performance metrics, and the determined first difference.

Some embodiments of the method for determining link performance metrics for terminals in a satellite communication network may include identifying the performance metrics comprise identifying at least one link performance metric using at least one communication burst that is part of regular communication between terminals. Some embodiments of the method for determining link performance metrics for terminals in a satellite communication network may include determining at least a modulation or a coding for a signal sent from at least one of the terminals based on at least one of the terminal-to-satellite performance metrics.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Overview

Systems, devices, and methods are disclosed for determining link performances metrics for satellite communication terminals. Using link performances metrics, link budgets, and link margins may be determined. Link performances metrics may be determined for individual terminal uplinks and downlinks, and signal modulation and coding may also be decided for the links. Link performance metrics may also be determined for total links that may include both an uplink and a downlink component. Manual and automated fixed link adaptation mechanisms, along with dynamic link adaptation mechanisms, are also disclosed.

Figure 1:
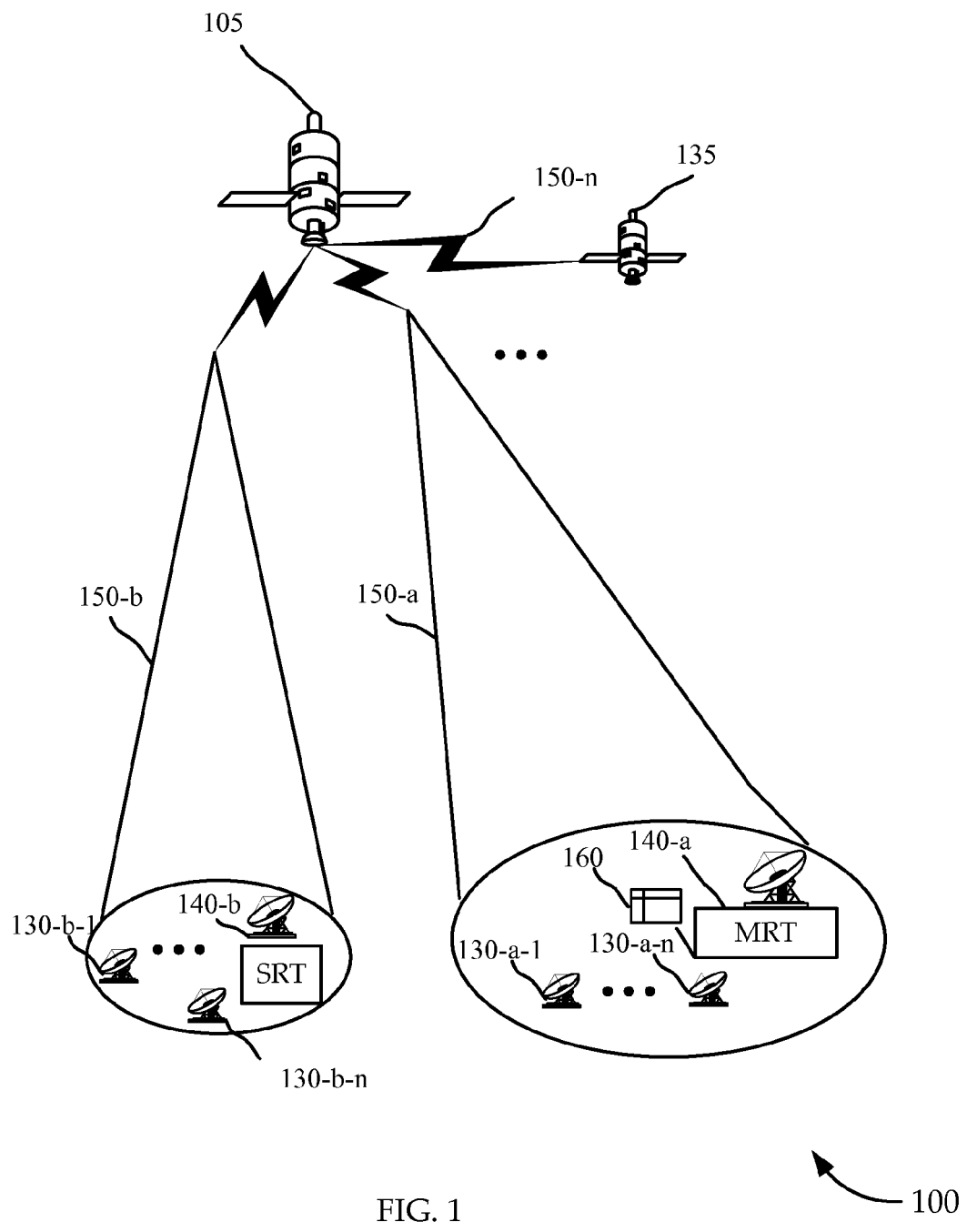
FIG. 1 is a block diagram of a satellite communication system, in accordance with various embodiments.

Systems, devices, and methods are described for a novel satellite communication system to estimate link performance metrics. These estimates may then be used to determine link budgets, link margins, modulation, and/or coding for signals between satellite terminals. FIG. 1 is a high level block diagram illustrating a satellite communication system 100 according to various embodiments of the invention. The system includes a satellite 105 in communication with terminals 130 (e.g., traffic terminals, user terminals, or gateways) and a reference terminal 140. Some embodiments may have multiple reference terminals. Merely by way of example, some embodiments may include a master reference terminal 140-*a* ("MRT"); also, a reference terminal may be a secondary reference terminals ("SRT"), such as 140-*b*. In some embodiments, satellite 105 may be in communication possibly with one or more other satellites 135.

Satellite 105 may have a single or multiple beams. FIG. 1 shows a satellite that includes three or more beams 150-*a*, 150-*b* . . . 150-*n*. Each beam 150 supports a number of terminals 130 and 140, and coverage of different beams may be non-overlapping or have varying measures of overlap. Alternatively, a beam may be used for communication with another satellite 135 via an inter-satellite link ("ISL"). Satellite 105 may provide connectivity between terminals 130 and 140 in the same beam and across beams, as well as to and from beams of other satellites 135 via ISLs. For terminals 130 and 140 served by the same satellite 105, there may be full-mesh, single-hop connectivity between terminals. For terminals 130 and 140 served by different satellites 105, 135, there may be full-mesh, two-hop connectivity between terminals.

In some embodiments, a reference terminal 140 may provide timing and/or synchronization functions for terminals 130. A reference terminal 140 may also provide frequency allocation and network management functions in some embodiments. A reference terminal 140 may transmit reference bursts, which may define a frame clock. Terminals 130 may synchronize themselves to a reference terminal 140 using such reference bursts. Some embodiments may include other reference terminals, such as secondary reference terminal 140-*b*. In some embodiments, secondary reference terminal 140-*b* may provide reference functions when a master reference terminal 140-*a* may be unable to do so. Secondary reference terminal 140-*b* may provide timing, frequency allocation, and/or network management for terminals in another beam 150-*b* of satellite 105. Secondary reference terminal 140-*b* may also help provide such functionality where reference terminal 140-*b* provides timing for terminals 130-*b* within a different beam 150-*b* of satellite 105 compared to a master reference terminal 140-*a* within beam 150-*a* of satellite 105. Other reference terminals may also help provide such functionality when satellite 105 communicates with other satellites, such as satellite 135.

Reference terminal 140 may act as a conduit for control center 160, such as a Network Control Center ("NCC"), which may transmit network control messages to terminals 130 in some embodiments. Reference terminal 140 may also transmit information to control center 160, such as link performance metrics in some embodiments. An NCC may be collocated with a reference terminal 140 in some embodiments. Messages may provide timing and signaling information, which enables over-the-satellite control of a network from an NCC and/or a Network Management System ("NMS"). Terminals 130 and satellite 105 may be managed by an NCC and/or reference terminals 140. An NCC may include, but is not limited to, the following functions: a) IP modem management (provisioning, configuration, software/firmware downloads to terminals, status and performance management); b) system broadcast messages; c) terminal acquisition and synchronization support; d) adaptive terminal frequency, timing, and power management support and correction; e) dynamic bandwidth/resource allocation; and f) interface with network management and router management. An NCC may manage networking timing, synchronization, terminal acquisition, network configuration, and/or bandwidth management. An NCC may also act as an NMS server. An NMS may be a client-server system with a web-based graphical interface. In some embodiments, an NMS client may securely access an NCC server from different locations. An NCC may also calculate link performance metrics between terminals 130 and/or between terminals 130 and satellite 105 in accordance with various embodiments. An NCC may determine modulation and/or coding for signals based on link performance metrics.

Terminals 130 and 140 may be designed for stand-alone operation, requiring no local operator control. Terminal configuration and monitoring may be over the air via an NMS, or via telnet for example, in some embodiments. A terminal may also include a console interface port for unit installation.

Although the communication system 100 is illustrated as a geostationary satellite-based communication system, it should be noted that various embodiments described herein are not limited to use in geostationary satellite-based systems; for example, some embodiments could be low earth orbit ("LEO") satellite-based systems. Terminals 130 may include, for example, traffic, gateways, or subscriber terminals (sometimes called user terminals). The system 100 may be a star, mesh, or hybrid, and may be implemented in an existing star, mesh, or hybrid system. Merely by way of example, traffic terminals 130 in a mesh network may communicate with each other and a reference terminal 140 through satellite 105.

One or more computing devices may be connected locally (e.g., a LAN, with wired or wireless connectivity) with a terminal, such as terminal 130 and/or reference terminal 140, and a connected terminal may be connected to a wider network, as well. Data and information, such as IP datagrams, may be sent from such a connected device through a terminal and the satellite 105, and to another terminal 130 (or other satellite 135). A variety of physical layer transmission modulation and coding techniques may be used on links between the satellite 105 and a terminal (or other satellite 135), including those defined with the DVB-S2 and WiMAX standards. Different multiplexing schemes may be used as well, including Multi-Frequency Time-Division Multiple Access ("MF-TDMA"), TDMA, Frequency Division Multiple Access ("FDMA"), Orthogonal Frequency Division Multiple Access ("OFDMA"), Code Division Multiple Access ("CDMA"), or any number of hybrid or other schemes known in the art. In various embodiments, the physical layer techniques may be the same, or different, for downstream and upstream links between the satellite 105 and a terminal (or other satellite 135). In one embodiment, the system 100 will support binary phase shift keying ("BPSK") and quadrature phase shift keying ("QPSK") modulations and Viterbi and Reed-Solomon forward error correction ("FEC"). The system may additionally support 8-PSK and Turbo code FEC.

Determination of which modulation and coding techniques to utilize for communication between the different terminals 130 and 140 may be based upon link performance metrics between the different terminals. Performance of individual links may provide a measure of the conditions along different communication links. Uplink, downlink, and total link performance metrics, such as link budgets, may be determined. Each link may have an associated link performance metric that may be characterized in different ways including without limitation signal-to-noise ratio ("SNR"), carrier-to-noise ratio ("C/N"), energy per bit per noise ratio ("Eb/No"), and/or bit error rate ("BER"), for example.

Embodiments may involve different types of transponders as part of satellite 105. In some embodiments, a transponder may be a transparent and/or bent pipe transponder. A transparent and/or bent pipe transponder may alter the amplitude and the frequency of a received signal from a terminal; such a transponder may not alter the modulation. In some embodiments, modulation and coding for signals between two terminals may be based on the total link performance determined through the disclosed methods, systems, and devices. In some embodiments, a transponder may be a regenerative transponder. A regenerative transponder may provide processing onboard satellite 105 such that a received signal is altered before retransmission to a terminal. In some embodiments, modulation and coding between two terminals may be based on the individual uplink and/or downlink performance for each terminal.

1. Link Performance Difference Metrics

Methods, systems, and devices are disclosed that utilize link performance difference metrics. A link performance difference metric may also be referred to as a difference between link performance metrics. A link performance difference metric for a terminal may be used to determine a measure of an individual or total link performance between the terminal and other terminals. Link performance difference metrics may be used to determine link budgets and link margins. Link performance difference metrics may also be utilized to help determine and/or optimize modulation and/or coding for signals between terminals.

A link performance difference metric for a terminal, such as terminal 130 in system 100 of FIG. 1, may reflect the differences between the terminal and a reference terminal. In some embodiments, a reference terminal may be a master reference terminal ("MRT"), such as reference terminal 140-a in system 100 of FIG. 1. A reference terminal may also be a secondary reference terminal ("SRT"), such as reference terminal 140-b in system 100 of FIG. 1. Link performance difference metrics may relate downlink differences between a terminal and a reference terminal, which may be referred to as a downlink performance difference metric. In a system with a network of terminals, a link performance difference metric may be determined for each terminal with respect to a reference terminal. In some embodiments, link performance metric information may be sent to control center 160 where the information may be utilized to determine link performance difference metrics or other link performance metrics for terminals within system 100. In some embodiments, link performance metric information may be sent to control center 160 as part of regular communication between terminals and the control center. In some embodiments, link performance metric information may be provided by an operator.

Control center 160 may determine link performance difference metrics in numerous different ways. In one embodiment, a link performance difference metric for a terminal may be based on the hardware and footprint at the terminal relative to the hardware and foot print at a reference terminal. A link performance difference metric for a terminal may be based on a beam strength, antenna gain, system temperature and low-noise-amplifier at the terminal relative to similar factors at the reference terminal. Beam strength may be based on the footprint of a satellite beam in some embodiments. Antenna gain may be based on size of the terminal receiver in some embodiments. Similar low-noise-amplifiers and controlled temperatures may be used at various sites to ensure the same system temperature. Other factors may also be taken into account reflecting the differences between a terminal and a reference terminal, including but not limited to the following: orientation of a terminal's antenna, polarization differences, co-channel interference and adjacent channel interference. In some embodiments, control center 160 may receive this information and store it to be used to determine these different link performance difference metrics. Control center 160 may also receive information from terminals 130 and 140 that may be utilized to determine link performance metrics and link performance difference metrics as discussed in more detail below.

In some embodiments, a satellite communication system, such as system 100, configured to determine link information between terminals in a satellite communication system is provided. System 100 may include multiple terminals 130, including reference terminals 140. System 100 may include control center 160 in communication with at least a subset of the terminals. Control center 160 may be configured to identify a first link performance metric for a first terminal from the plurality of terminals. The control center may be configured to identify a second link performance metric for a reference terminal from the plurality of terminals. The control center may be configured to identify a third link performance metric between the satellite and a second terminal from the plurality of terminals. The control center may be configured to determine a difference between the first and second link performance metrics. The control center may be configured to calculate a link performance metric between the first terminal and the second terminal utilizing the third link performance metric and the determined difference between the first and second link performance metrics.

Some embodiments of the satellite communication system configured to determine link information between terminals in a satellite communication system may include the control center configured to calculate the link performance metric between the first terminal and second terminal occurs before a communication link is established between the first terminal and the second terminal. In some embodiments, the control center is further configured to determine at least a modulation or a coding for a signal sent between the first terminal and the second terminal utilizing the calculated link performance metric.

Some embodiments of the satellite communication system configured to determine link information between terminals in a satellite communication system may include the control center configured to identify at least one of the link performance metrics comprises identifying at least one characteristic of the respective terminal. In some embodiments, the control center may be configured to identify at least one characteristic of the respective terminal identifying at least a hardware component that contributes to the system temperature, an antenna size, a beam strength, or an antenna gain for the respective terminal. In some embodiments, the control center may be configured to identify at least one of the link performance metrics comprises identifying a signal to noise ratio between the satellite and the respective terminal. In some embodiments, the control center may be configured to identify the noise ratio between the satellite and the respective terminal comprises identifying at least a carrier-to-noise ratio, a bit error rate, or an energy-per-bit-to-noise ratio. The control center may be configured to identify the carrier-to-noise ratio, the signal-to-noise ratio, the bit error rate, or the error-per-bit-to-noise ratio between the satellite and the respective terminal further comprises utilizing a reference burst sent from the reference terminal and received at the respective terminal. The control center may be configured to identify the carrier-to-noise ratio, the bit error rate, or the energy-per-bit-to-noise ratio between the satellite and the respective terminal further comprises utilizing a signal burst sent from the first terminal and received at the respective terminal.

Some embodiments of the satellite communication system configured to determine link information between terminals in a satellite communication system may include the control center configured to calculate the link performance metric comprises calculating a terminal-to-terminal performance metric between the first terminal and the second terminal via the satellite. In some embodiments, the control center configured to identify at least one link performance metric comprises identifying a downlink performance metric.

For example, in some embodiments, a link performance difference metric for a terminal may be a difference between a carrier-to-noise ratio ("C/N") for a downlink for the terminal relative to a C/N for a downlink for a reference terminal. Throughout this application, this delta C/N metric may be represented as:

$$\left(\Delta \frac{C}{N}\right).$$

A subscript may be used on this delta C/N metric to reflect which terminal the parameter refers to. One skilled in the art will recognize that different link performance difference metrics may be formulated based on other measures of performance, including without limitation signal-to-noise ratio ("SNR"), bit error rate ("BER"), and/or energy-per-bit-to-noise ratio ("Eb/No").

Figure 2A:
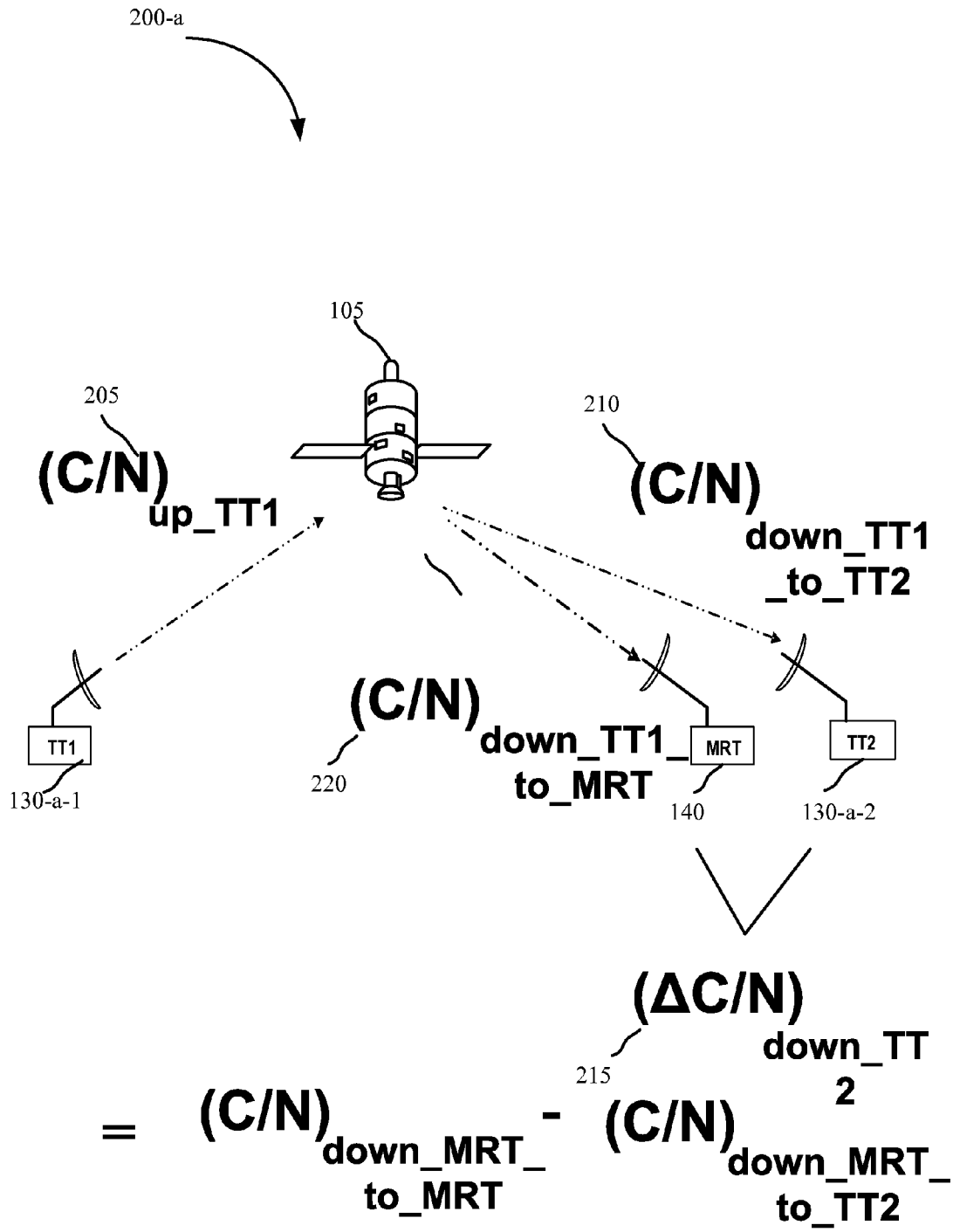
FIG. 2A is a block diagram of a satellite communication system involving communication between a terminal and a reference terminal, in accordance with various embodiments.

FIG. 2A shows a block diagram illustrating components of a system 200-a where a link performance difference metric may be utilized to determine link performances. System 200-a may include a first terminal 130-a-1 ("TT1"), a second terminal 130-a-2 ("TT2"), and reference terminal 140 ("MRT"). System 200-a may be an example of a system 100 of FIG. 1.

A link performance difference metric for a terminal may be used to determine different link performances involving the terminal. Merely by way of example, a link performance difference metric for terminal 130-a-2, represented as a delta C/N metric in some embodiments, may be used to determine link performance information with respect to first terminal 130-a-1. Merely by way of example, the downlink performance between the two terminals may be determined using a formula such as the following:

$$\left(\frac{C}{N}\right)_{down\_TT1\_to\_TT2} = \left(\Delta \frac{C}{N}\right)_{down\_TT2} \left(\frac{C}{N}\right)_{down\_TT1\_to\_MRT}.$$

In this equation, $$\left(\frac{C}{N}\right)_{down\_TT1\_to\_TT2}$$

210 represents the downlink C/N between first terminal 130-a-1 and second terminal 130-a-2 via satellite 105, $$\left(\Delta \frac{C}{N}\right)_{down\_TT2}$$

215 is a link performance difference metric for second terminal 130-a-2 with respect to reference terminal 140, and $$\left(\frac{C}{N}\right)_{down\_TT1\_to\_MRT}$$

220 is a downlink C/N between first terminal 130-a-1 and reference terminal 140 via satellite 105. In some embodiments, $$\left(\Delta \frac{C}{N}\right)_{down\_TT2}$$

215 may be represented using a general formula such as the following:

$$\left(\Delta \frac{C}{N}\right)_{down\_TT} = \left(\frac{C}{N}\right)_{down\_MRT\_to\_MRT} - \left(\frac{C}{N}\right)_{down\_MRT\_to\_TT},$$

where TT may represent a terminal such as TT2, merely by way of example.

A link performance difference metric may also be used to determine a total link performance between first terminal 130-a-1 to second terminal 130-a-2. In one embodiment, a total link performance between the two terminals may be represented by an uplink C/N 205 for the first terminal 130-a-1 to satellite 105 and a downlink C/N 210 between the two terminals with an equation such as the following:

$$\left(\frac{C}{N}\right)_{rx} = \frac{1}{\frac{1}{\left(\frac{C}{N}\right)_{up\_TT1}} + \frac{1}{\left(\frac{C}{N}\right)_{down\_TT1\_to\_TT2}}}.$$

With a link performance difference metric, such as $$\left(\Delta \frac{C}{N}\right)_{down\_TT2}$$

215, a total link performance metric may be determined between terminals 130-a-1 and 130-a-2 using an equation such as the following:

$$\left(\frac{C}{N}\right)_{rx} = \cfrac{1}{\cfrac{1}{\left(\frac{C}{N}\right)_{up\_TT1}} + \cfrac{1}{\left(\Delta\frac{C}{N}\right)_{down\_TT2}\left(\frac{C}{N}\right)_{down\_TT1\_to\_MRT}}}.$$

As mentioned above, there are numerous ways of determining a link performance difference metric for a terminal, which may then be used to determine different measures of link performance related to the terminal as described above. Other ways of determining a link performance difference metric for a terminal include, but are not limited to, the following examples.

In some embodiments, a link performance difference metric for a terminal may be determined using signaling between terminals and a reference terminal. In some embodiments, this signaling may be existing signaling such that link performance difference metrics may be determined without increasing traffic in a communication system.

Figure 2B:
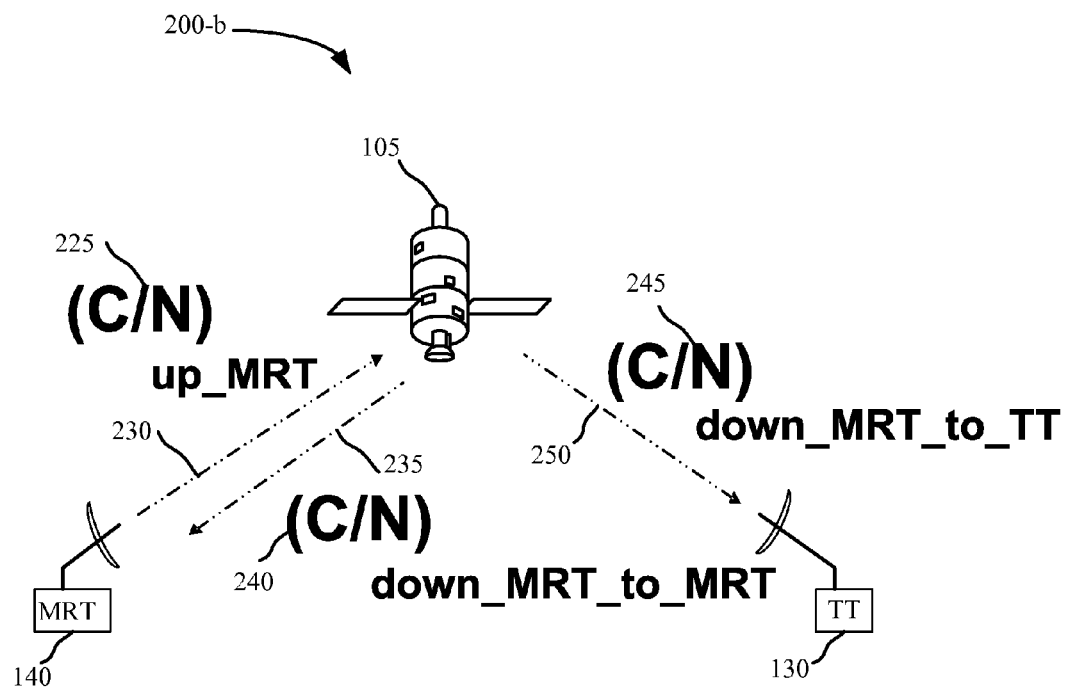
FIG. 2B is a block diagram of a satellite communication system involving communication between a reference terminal and itself, in accordance with various embodiments.

In one embodiment, a link performance difference metric for a terminal may be determined based on reference bursts. A reference terminal may transmit references bursts, which may be received by the reference terminal and the other terminals. FIG. 2B shows a block diagram of a system 200-b involving such reference bursts, which may be an example of system 100 in FIG. 1. Reference terminal 140 may transmit reference burst 230 to satellite 105. Burst 230 may have an associated uplink C/N 225 associated with it in some embodiments. Reference burst 235 may then be received by reference terminal 140, while reference burst 250 may be received by terminal 130 ("TT"). From these received reference bursts 235 and 250, a link performance difference metric may be utilized to compare the downlink C/N 240 for the reference burst at terminal 130 and downlink C/N 245 for the reference burst at reference terminal 140. In some embodiments, this may be reflected as a delta C/N metric, such as $$\left(\Delta\frac{C}{N}\right)_{down\_TT}.$$

The following equation reflects one way that these differences in C/N for reference terminal 140 and terminal 130 may be expressed:

$$\left(\Delta\frac{C}{N}\right)_{down\_TT} = \left(\frac{C}{N}\right)_{down\_MRT\_to\_MRT} - \left(\frac{C}{N}\right)_{down\_MRT\_to\_TT}.$$

Figure 2C:
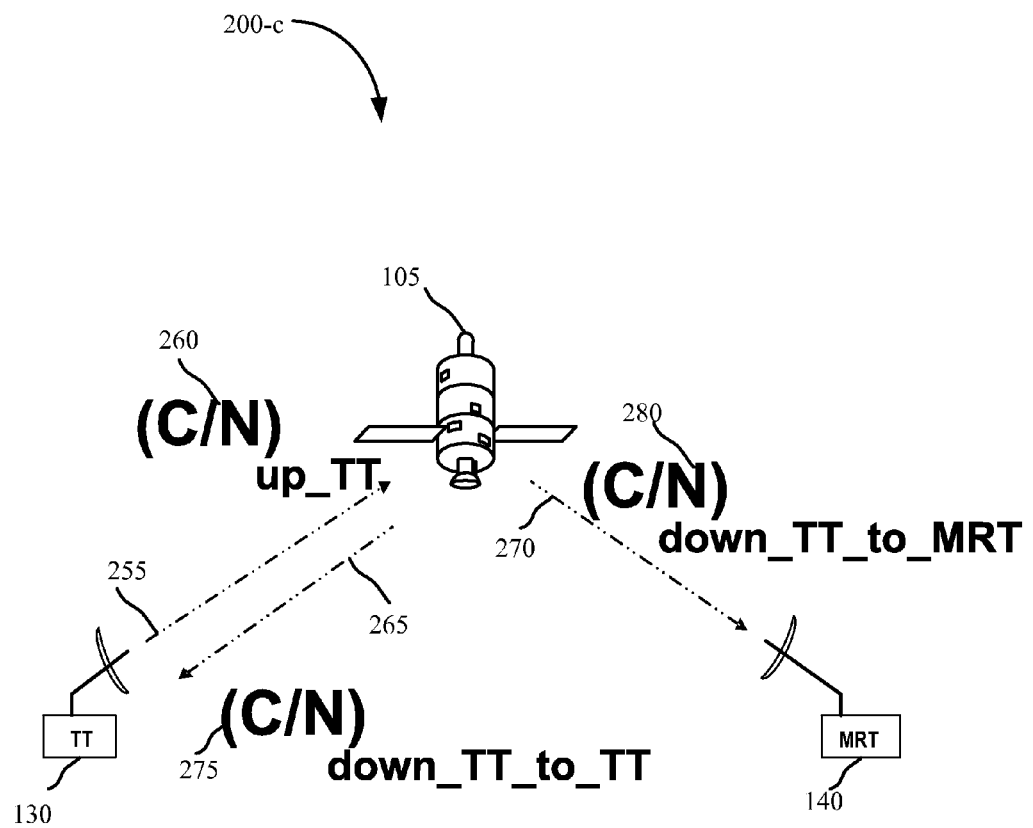
FIG. 2C is a diagram of a satellite communication system involving communication between a terminal and itself, in accordance with various embodiments.

In some embodiments, determining link performance difference metrics for terminals may utilize signals that the terminals themselves send, such as control and/or signal bursts. FIG. 2C shows a block diagram of a system 200-c, which may be an example of system 100 in FIG. 1, involving control and/or signal bursts 255 from terminal 130. Terminal 130 may transmit burst 255 to satellite 105. Burst 255 may have an associated uplink C/N 260 associated with it in some embodiments. Satellite 105 may retransmit burst 255 as burst 270 to reference terminal 140 and as burst 265 to terminal 130. A link performance difference metric may then be expressed by relating downlink C/N 280 for burst 270 at the reference terminal 140 and downlink C/N 275 for burst 265 at terminal 130. In some embodiments, this may be reflected as a delta C/N metric, such as $$\left(\Delta\frac{C}{N}\right)_{down\_TT}.$$

The following equation may reflect these differences in C/N for reference terminal 140 and terminal 130 using information from control and/or signal bursts:

$$\left(\Delta\frac{C}{N}\right)_{down\_TT} = \left(\frac{C}{N}\right)_{down\_TT\_to\_MRT} - \left(\frac{C}{N}\right)_{down\_TT\_to\_TT}.$$

In some embodiments, a link performance difference metric may relate a master reference terminal to a secondary reference terminal. In some embodiments, a reference terminal-to-reference terminal link performance difference metric may then be utilized along with a terminal-to-reference terminal link performance difference metric to determine link performances between terminals within the footprints of different beams of a satellite.

A link performance difference metric may be determined for clear sky conditions. In some embodiments, a link performance difference metric determined under clear sky conditions may be modified with a dynamic margin factor, such as a rain margin, to provide another measure of link performance difference metric for a terminal. A link performance difference metric may be determined under dynamic conditions in some embodiments.

In some embodiments, link performance difference metrics for terminals may be used to determine link budgets and link margins. Link performance difference metrics may be determined for terminals when there is inter-satellite communication, such as in system 100.

Figure 3A:
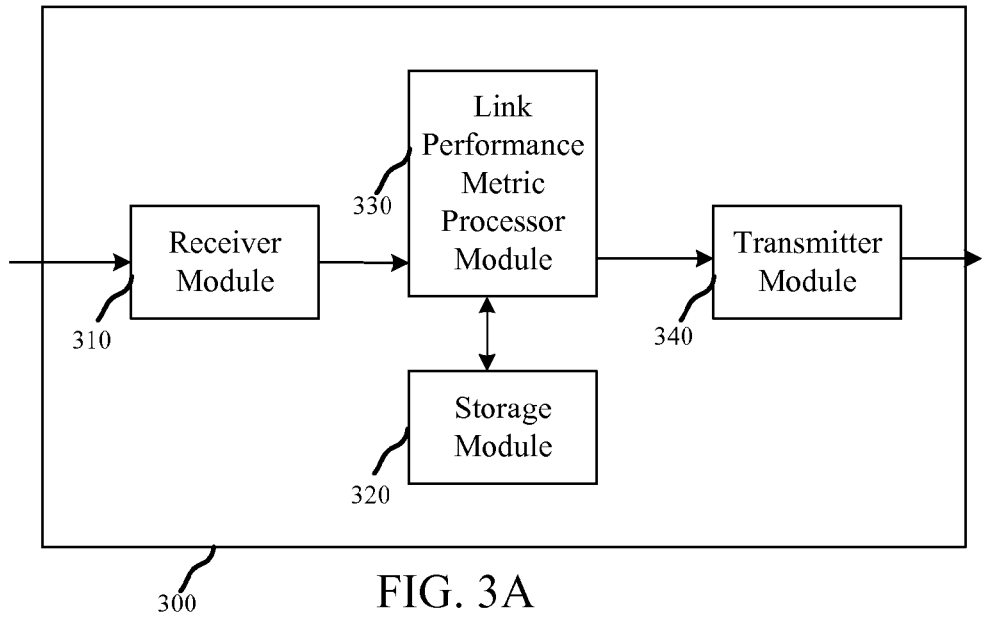
FIG. 3A is a block diagram of a satellite communication device, in accordance with various embodiments.

FIG. 3A is a block diagram of a satellite communication device 300 for determining link information between terminals in a satellite communication network. Device 300 may be implemented within systems such as system 100 of FIG. 1 and/or systems 200 of FIGS. 2A-C and may be implemented with methods 400 of FIG. 4 and methods 500 of FIG. 5 as discussed in more detail below. In some embodiments, device 300 may be part of a terminal, such as terminal 130 or reference terminal 140. In some embodiments, device 300 may be part of a satellite, such as satellite 105. In some embodiments, device 300 may be part of a control center, such as control center 160.

Device 300 may include different modules, such as receiver module 310, storage module 320, link performance metric processor module 330, and/or transmitter module 340. Device 300 may include other modules. Receiver module 310 may receive different information from the satellite communication network, including information from terminals 130, reference terminals 140, and satellite 105. For example, receiver module 310 may receive link performance metrics from different terminals 130, 140, and/or satellite 105. Information received at receiver module 310 may be stored on storage module 320. Storage module 320 may also store other information, such as link performance difference metrics, merely by way of example. Link performance metric processor module 330 may provide a variety of functions, including, but not limited to, determining link performance difference metrics and calculating link performance metrics between different terminals. Device 300 may also include a transmitter module 340. Transmitter module 340 may transmit different information into the satellite communication network. For example, transmitter module 340 may transmit link performance metrics and/or link performance difference metrics, merely by way of example. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 3B:
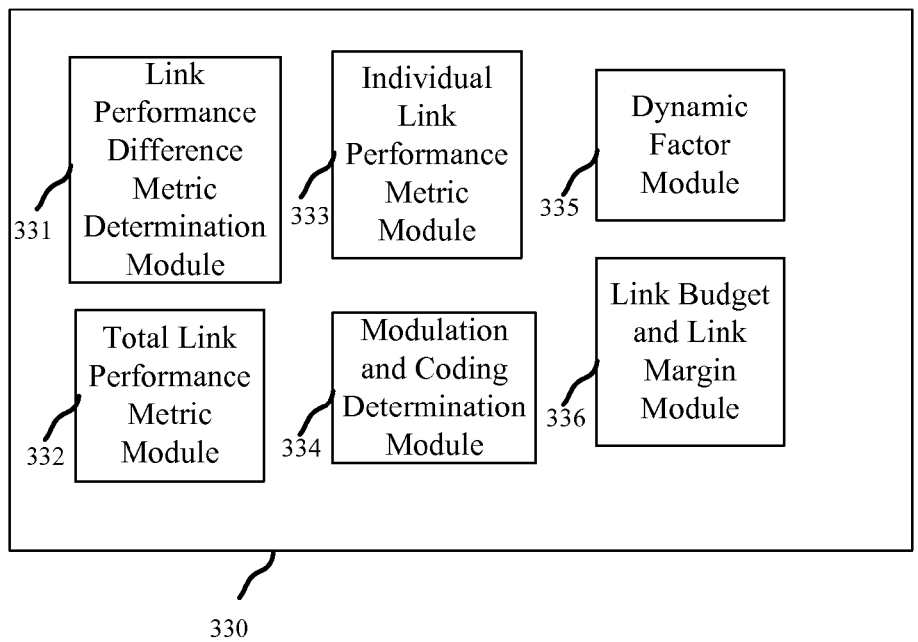
FIG. 3B is a block diagram of a link performance metric processor module that may be part of a satellite communication device, in accordance with various embodiments.

FIG. 3B is a block diagram of a link performance metric processor module, such as module 330, of satellite communication device 300 of FIG. 3A. Link performance metric processor module 330 may include different modules, including, but not limited to, link performance difference metric module 331, total link performance metric module 332, individual link performance metric module 333, modulation and/or coding determination module 334, dynamic factor module 335, and/or link budget and/or link margin module 336. Link performance difference metric module 331 may determine the difference between link performance metrics it may receive from receiver module 310 and/or storage module 320. Total link performance metric module 332 may determine link performance metrics that may include both an uplink and downlink component. Individual link performance metric module 333 may determine link performance metrics such as uplink performance metrics and/or downlink performance metrics. Modulation and/or coding determination module 334 may determine modulation and/or coding for signals sent between terminals and satellites based on link performance metrics. Dynamic factor module 335 may determine dynamic factors such as rain fade factors for uplink and/or downlink signals that may be taken into account when determining link performance metrics. Link budget and/or link margin module 336 may determine link budgets and/or link margins based on different factors such as link performance metrics. These modules may be utilized to implement methods such as method 400 of FIG. 4 and method 500 of FIG. 5 below.

Figure 4:
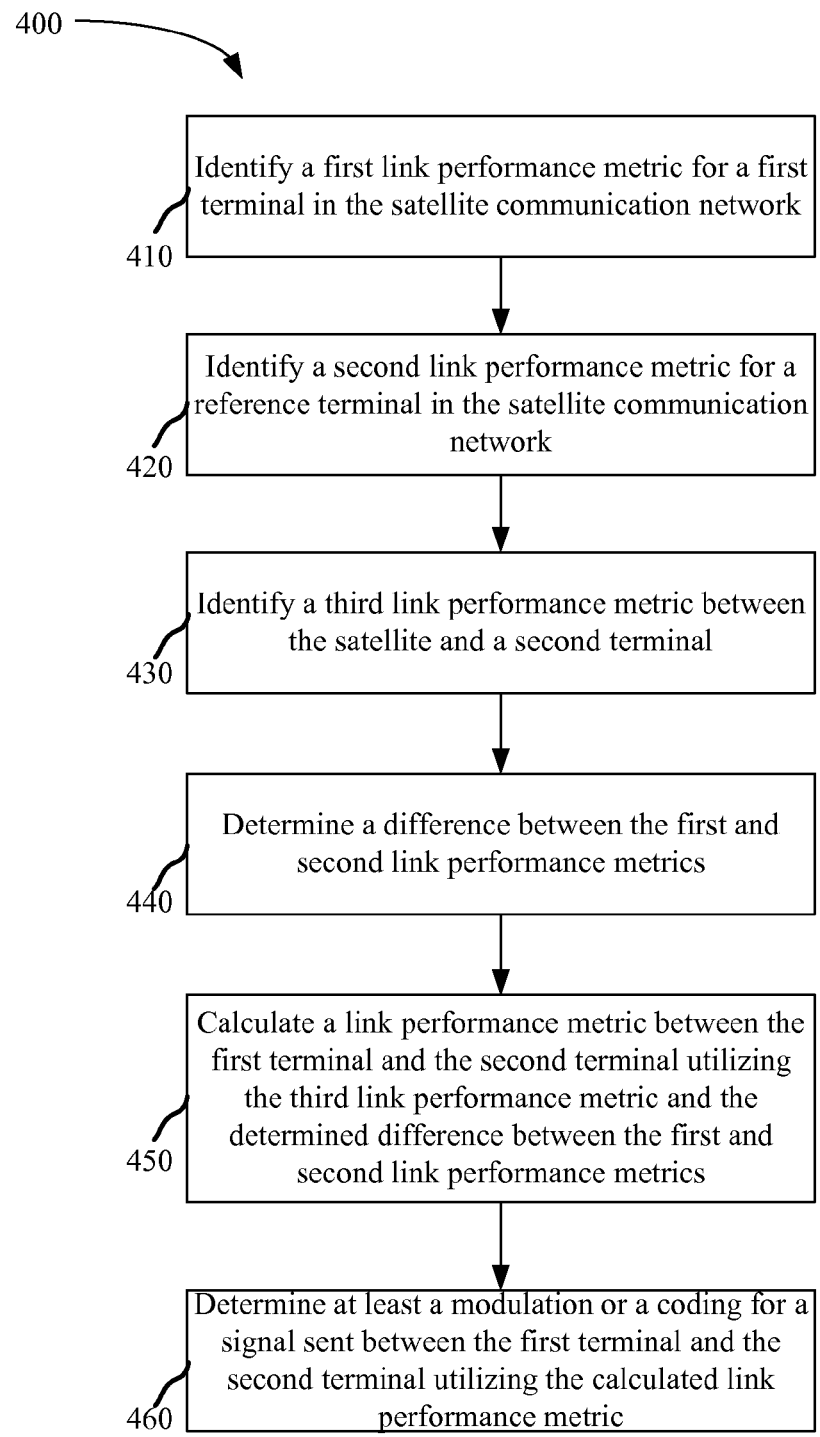
FIG. 4 is a flow diagram of a method for determining link performance information, in accordance with various embodiments.

FIG. 4 is a block diagram of method 400 for determining link information between terminals in a satellite communication network. Link information may include link performance metrics and link performance difference metrics, merely by way of example. Method 400 may be implemented on systems such as system 100 of FIG. 1 and systems 200 of FIG. 2A, FIG. 2B, and FIG. 2C. Method 400 may also be implemented using devices such as device 300 of FIG. 3A and FIG. 3B.

At block 410, a first link performance metric for a first terminal in the satellite communication network may be identified. Identifying the link performance metric may include identifying a downlink performance metric for the terminal. Identifying the link performance metric may include identifying at least one characteristic of the terminal. For example, characteristics may include, but are not limited to a hardware component that dictates system temperature, an antenna size, a beam strength, and/or an antenna gain for the terminal. In some embodiments, orientation of a terminal antenna, polarization, co-channel interference, and/or adjacent channel interference may also be utilized in identifying the link performance metric.

In some embodiments, identifying the link performance metric may include identifying a signal-to-noise ratio for the terminal. For example, signal-to-noise ratios may include a carrier-to-noise ratio, a bit error rate, or an energy-per-bit-to-noise ratio. In some embodiments, identifying a carrier-to-noise ratio, a bit error rate, or an energy-per-bit-to-noise ratio for the terminal may include utilizing a reference burst sent from the reference terminal and received at the terminal. Some embodiments may utilize a signal burst and/or control sent from the terminal and received at the terminal.

At block 420, a second link performance metric for a reference terminal in the satellite communication network may be identified. As discussed in block 410, there are numerous ways that a link performance metric may be identified for the terminal, including a reference terminal. Identifying the link performance metric may include identifying a downlink performance metric for the reference terminal. Identifying the link performance metric may include identifying at least one characteristic of the reference terminal. For example, characteristics may include, but are not limited to, a system temperature, an antenna size, a beam strength, and/or an antenna gain for the reference terminal. In some embodiments, orientation of a terminal antenna, polarization, co-channel interference, and/or adjacent channel interference may also be utilized in identifying the link performance metric.

In some embodiments, identifying the link performance metric may include identifying a signal-to-noise ratio for the reference terminal. For example, signal-to-noise ratios may include a carrier-to-noise ratio, a bit error rate, and/or an energy-per-bit-to-noise ratio. In some embodiments, identifying a carrier-to-noise ratio, a bit error rate, or an energy-per-bit-to-noise ratio for the reference terminal may include utilizing a reference burst sent from the reference terminal and received at the terminal. Some embodiments may utilize a signal burst and/or control sent from another terminal and received at the reference terminal.

At block 430, a third link performance metric between the satellite and a second terminal may be identified. There are numerous ways that a link performance metric may be identified between the satellite and the terminal. In some embodiments, a link performance metric may be identified between the satellite and the terminal using fixed link adaptation and/or dynamic link adaptation as discussed in more detail below.

In some embodiments, identifying the link performance metric may include identifying a downlink performance metric from the satellite to the terminal. Identifying the link performance metric may include identifying at least one characteristic of the terminal. For example, characteristics may include, but are not limited to, a system temperature, an antenna size, a beam strength, or an antenna gain for the terminal. In some embodiments, orientation of a terminal antenna, polarization, co-channel interference and/or adjacent channel interference may also be utilized in identifying the link performance metric.

In some embodiments, identifying the link performance metric may include identifying a signal-to-noise ratio between the satellite and the terminal. For example, signal-to-noise ratios may include a carrier-to-noise ratio, a bit error rate, or an energy-per-bit-to-noise ratio. In some embodiments, identifying a carrier-to-noise ratio, a bit error rate, or an energy-per-bit-to-noise ratio between the satellite and the terminal may include utilizing a reference burst sent from the reference terminal and received at the terminal. Some embodiments may utilize a signal burst and/or control sent from the terminal and received at the terminal.

At block 440, a difference between the first and second link performance metrics may be determined. This difference may be referred to as a link performance difference metric in some embodiments. The first and second link performance metrics may be determined at block 410 and 420.

At block 450, a link performance metric between the first terminal and the second terminal may be calculated utilizing the third link performance metric and the determined difference between the first and second link performance metrics. In some embodiments, calculating the link performance metric between the first terminal and second terminal may occur before a communication link is established between the first terminal and the second terminal. In some embodiments, calculating the link performance metric includes calculating a terminal-to-terminal performance metric between the first terminal and the second terminal via the satellite. This may be referred to as a total link performance metric. A total link performance metric may include an uplink component from one of the terminals to the satellite and a downlink component from the satellite to the other terminal. In some embodiments, this calculation may be done at a control center in the satellite communication network. In some embodiments, the calculation may be done at a terminal or a reference terminal, merely by way of example.

At block 460, modulation and/or coding for a signal sent between the first terminal and the second terminal may be determined utilizing the calculated link performance metric from block 450.

Method 400 may be done under different conditions. For example, identifying link performance metrics at block 410, 420, and/or 430 may be done under clear sky conditions. In some embodiments, the identified link performance metrics may be modified by a rain fade factor to take into account rain fade conditions. In some embodiments, non-clear sky conditions may be considered dynamic conditions and may again account for utilizing a dynamic fade factor. In some embodiments, identifying link performance metrics at block 410, 420, and/or 430 may be done under dynamic conditions.

Identifying link performance metrics at block 410, 420, and 430 may be done at a variety of locations. For example, identifying link performance metrics at block 410, 420, and/or 430 may be done at terminals and/or reference terminals. In some embodiments, identifying link performance metrics at block 410, 420, and/or 430 may be done at a control center. The identified link performance metrics and/or determined difference between link performance metrics may also be transmitted through the satellite communication network to other terminals, reference terminals, and/or control centers from where the metrics are identified. In some embodiments, identifying link performance metrics at block 410 and 420 may be done by an operator and may be provided to a control center or the terminals.

Figure 5:
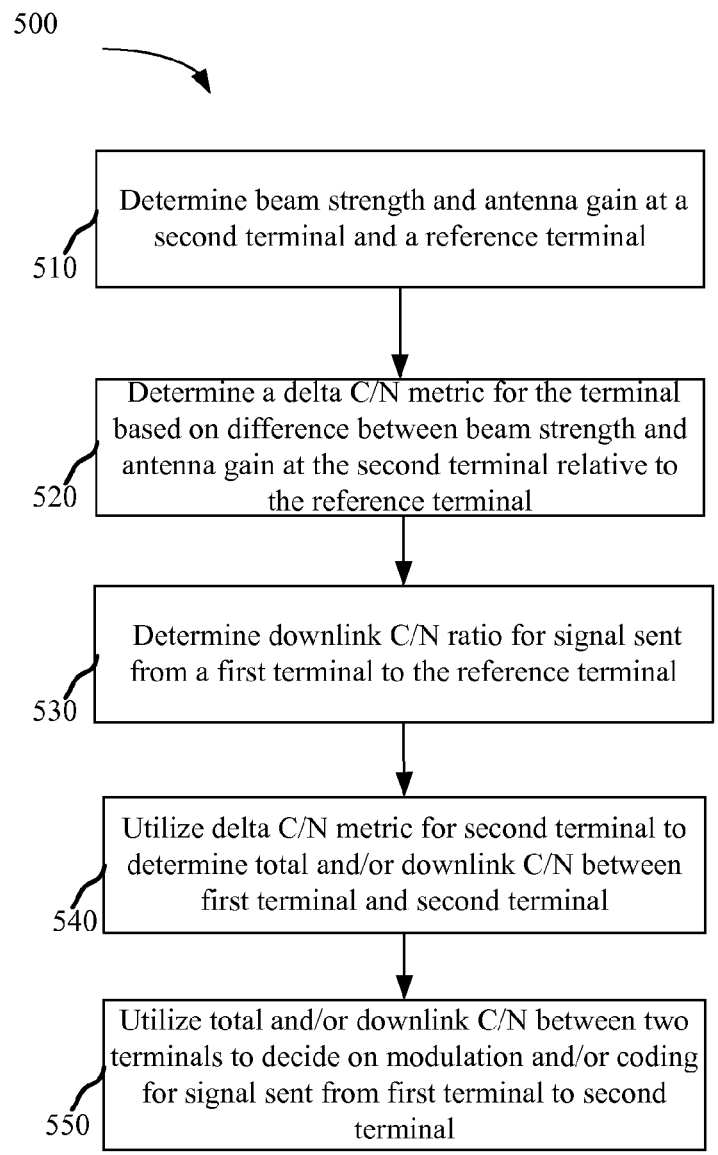
FIG. 5 is a flow diagram of a method for determining delta C/N metrics, in accordance with various embodiments.

FIG. 5 shows another embodiment of a method 500 involving the link performance difference metric. Method 500 may be implemented on a satellite communication system such as system 100 of FIG. 1. At block 510, a system temperature, a beam strength and an antenna gain are determined for a terminal (referred to as a second terminal here) and for a reference terminal. At block 520, a link performance difference metric is determined, reflecting as a difference (or delta) between a carrier-to-noise ratio (i.e. a delta C/N ratio as discussed above) for the terminal and for the reference terminal based on the difference in their respective system, temperature, beam strengths and antennae gains. At block 530, a downlink C/N ratio is determined for a signal sent from a first terminal to the reference terminal. Using the delta C/N parameter for the second terminal from block 520, a total and/or downlink C/N may be determined between the first and second terminals at block 540. The total and/or downlink C/N determined at block 540 may then be utilized to decide on modulation and coding for signals sent from the first terminal to the second terminal at block 550.

As disclosed above, link performance difference metrics, or in some embodiments delta C/N metrics, may be determined for each terminal in a communication system. A link performance difference metric for a terminal generally relates the terminal to a reference terminal. In some embodiments, using a link performance difference metric for a terminal allows for determination of link performances between the terminal and other terminals without first establishing a communication link between the two terminals. In some embodiments, the determined link performance information may then be used to decide on modcodes for signals sent between the two terminals. In some embodiments, modcodes may be determined for each link, including uplinks, downlinks, and/or total links.

As will be discussed more below, link performance difference metrics (or parameters) may be utilized to determine individual and/or total link performances metrics for terminals and reference terminals in a system that may be utilized as part of embodiments involving a fixed link adaptation mechanism. Furthermore, link performance difference metrics may be used for embodiments involving a dynamic link adaptation mechanism.

2. Fixed Link Adaptation:

Methods, systems, and devices for fixed link adaptation ("FLA") are disclosed next. FLA may provide uplink, downlink, and/or total link performance information. This link performance information may be used in numerous ways, including but not limited to determining link budgets, link margins, and/or deciding on modcodes for transmissions sent between different terminals. FLA may utilize link performance difference metrics as discussed in this application. FLA may take into account differences in the hardware and footprint at terminals and at reference terminals in order to choose optimum signal modulation and coding that may be used to close a link between two terminals in some embodiments. FLA may determine link performance information for terminals utilizing bursts sent from terminals and reference terminals. In some embodiments, the bursts may be already part of the regular communication within a communication system. In various embodiments, FLA may be implemented automatically, manually, or in a combination thereof. FLA may be based on clear sky conditions. In some embodiments, FLA may be adapted to apply to dynamic and/or non-clear sky conditions.

Embodiments of FLA may determine measures of uplink and downlink performance metrics for terminals, such as terminals 130 and reference terminals 140 in system 100 of FIG. 1. Some embodiments of FLA may use an automated mechanism for each terminal that may be run using the disclosed systems, methods, and devices in order to determine performance information. The determined performance information may be used to help decide on signal modulation and coding when the terminal communicates with other terminals.

In some embodiments, a satellite communication system, such as system 100, configured to determine link performance metrics for terminals in a satellite communication system is provided. The system may include multiple terminals, such as terminals 130 and reference terminals 140. The system may include a control center, such as control center 100, in communication with at least a subset of the terminals. The control center may be configured to identify a first round trip link performance metric from a first terminal to the first terminal via a satellite. The control center may be configured to identify a second round trip link performance metric from a reference terminal to the reference terminal via the satellite. The control center may be configured to identify a first one-way performance metric from the first terminal to the reference terminal via the satellite. The control center may be configured to identify a second one-way link performance metric from the reference terminal to the first terminal via the satellite. The control center may be configured determine a first difference between a known link performance metric for the first terminal and a known link performance metric for the reference terminal. The control center may be configured calculate at least one terminal-to-satellite performance metric utilizing the plurality of identified round trip link performance metrics, the plurality of identified one-way link performance metrics, and the determined first difference.

Some embodiments of the satellite communication system configured to determine link performance metrics for terminals in a satellite communication system may include a control center configured to identify at least one of the link performance metrics using at least one communication burst that is part of regular communication between terminals. The control center may be configured to use the at least one communication burst that is part of regular communication between terminals including using at least a reference burst from the reference terminal, a control burst from the first terminal, or a signal burst from the first terminal.

Some embodiments of the satellite communication system configured to determine link performance metrics for terminals in a satellite communication system may include a control center that is further configured to determine at least a modulation or a coding for a signal sent from at least one of the terminals based on at least one of the terminal-to-satellite performance metrics.

Some embodiments of the satellite communication system configured to determine link performance metrics for terminals in a satellite communication system may include a control center that is further configured to determine a second difference between a known link performance metric for a second terminal and a known link performance metric for the reference terminal. The control center may calculate a third one-way link performance metric from the first terminal to the second terminal via the satellite using a plurality of terminal-to-satellite performance metrics and the second determined difference.

Some embodiments of the satellite communication system configured to determine link performance metrics for terminals in a satellite communication system may include the control center configured to calculate at least an uplink performance metric for the first terminal, an uplink performance metric for the reference terminal, a downlink performance metric for the first terminal, or a downlink performance metric for the reference terminal. The control center configured to identify the plurality of link performance metrics occurs under clear sky conditions.

Embodiments of FLA may utilize the link performance difference metrics discussed in this application. Information regarding the strength of a beam and the downlink antenna gain at terminal 130 relative to reference terminal 140 may be determined as discussed above and input into embodiments of FLA. In some embodiments, an operator may input the performance difference information. Information may also be provided by a device, system, network, and/or computer. In some embodiments, a link performance difference metric for a specific terminal may be represented as a difference in carrier-to-noise ratios for the terminal such as a terminal 130 relative to a reference terminal 140.

In some embodiments of FLA, different bursts may be utilized to perform FLA. These bursts may be used to measure link performances between terminals. For example, bursts may be from: reference terminal to terminal; reference terminal to reference terminal; terminal to terminal; and/or terminal to reference terminal. Furthermore, a burst from a terminal may be received by the terminal itself along with the reference terminal, thus possibly reducing the number of bursts sent. Similarly, a burst from a reference terminal may be received by the reference terminal itself and the terminal. In some embodiments, a burst from a reference terminal would be received by more than one terminal, providing other possible efficiencies. Embodiments of FLA using these transmission bursts may be implemented in an automated way.

In some embodiments, the bursts that may be used for FLA may be bursts that are already part of the regular communication between a reference terminal 140 and terminals 130. Merely by way of example, a reference terminal may send reference bursts to the terminals, and the terminals may send control bursts and/or signal bursts to the reference terminals and/or the other terminals.

FIGS. 6A-D show block diagrams of an embodiment of FLA utilizing terminals and reference terminals, which may be an example of system 100 of FIG. 1. Each figure shows bursts that may be transmitted through a communication system such as system 100. From the received bursts, carrier-to-noise ratios for the total communication path, which may include an uplink and downlink component, may be measured. From these measured carrier-to-noise ratios, along with link performance difference metric information, individual uplink and downlink performance measures may be determined.

Figure 6A:
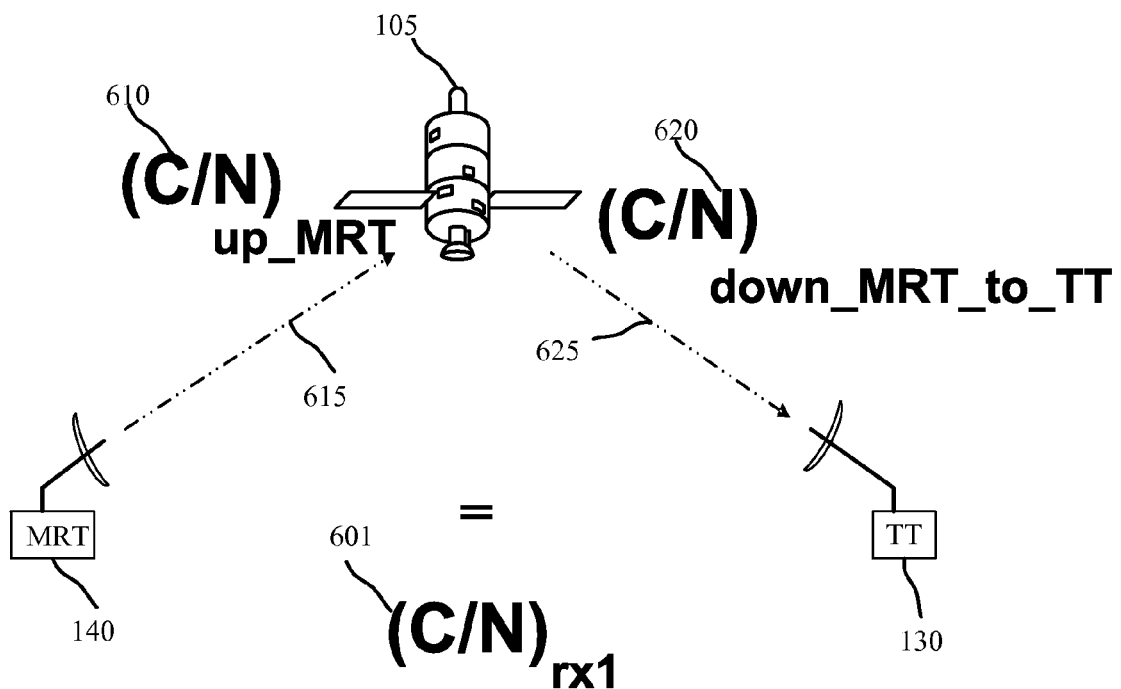
FIG. 6A is a block diagram of a satellite communication system involving communication between a reference terminal and a terminal as part of a fixed link adaptation mechanism, in accordance with various embodiments.

FIG. 6A shows burst 615 being sent up from reference terminal 140 to satellite 105, then burst 625 down to terminal 130. In some embodiments, bursts 615 and 625 may be reference bursts. A carrier-to-noise ratio $$\left(\frac{C}{N}\right)_{rx1}$$

601 for the total communication link between reference terminal 140 and terminal 130 may be measured.

$$\left(\frac{C}{N}\right)_{rx1}$$

601 may then provide the left-hand side of an equation such as FLA equation 1:

$$\left(\frac{C}{N}\right)_{rx1} = \frac{1}{\frac{1}{\left(\frac{C}{N}\right)_{up\_MRT}} + \frac{1}{\left(\frac{C}{N}\right)_{down\_MRT\_to\_TT}}}. \quad \text{FLA Equation 1}$$

In this equation, $$\left(\frac{C}{N}\right)_{up\_MRT}$$

610 represents an uplink C/N between reference terminal 140 and satellite 105 and $$\left(\frac{C}{N}\right)_{down\_MRT\_to\_TT}$$

620 represents a downlink C/N between reference terminal 140 and terminal 130 via satellite 105. FLA equation 1 may be used along with several other similar FLA equations (such as FLA equations 2, 3, and 4, shown and discussed below) and several link performance difference metric equations (such as FLA equations 5 and 6, shown and discussed below) to determine the individual terminal uplink and downlink carrier-to-noise ratios for the communication system.

Figure 6B:
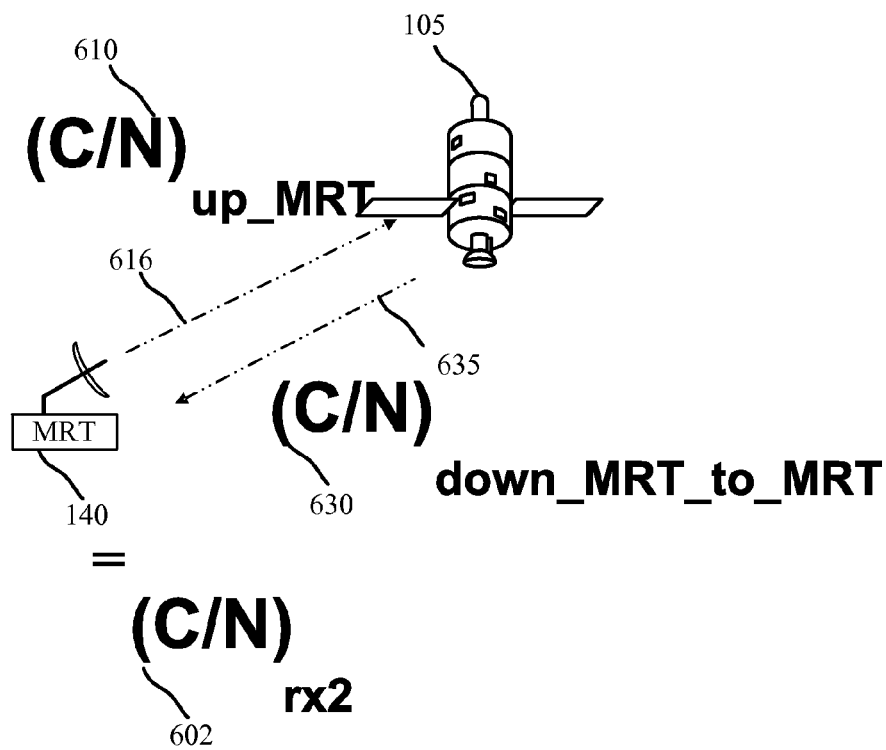
FIG. 6B is a block diagram of a satellite communication system involving communication between a reference terminal and itself as part of a fixed link adaptation mechanism, in accordance with various embodiments.

FIG. 6B shows burst 616 being sent up from reference terminal 140 to satellite 105 and then burst 635 back to the same reference terminal 140. In a similar fashion as discussed with FIG. 6A, a carrier-to-noise ratio $$\left(\frac{C}{N}\right)_{rx2}$$

602 for the total communication link between reference terminal 140 and itself may be measured.

$$\left(\frac{C}{N}\right)_{rx2}$$

602 may then provide the left-hand side of an equation such as FLA equation 2:

$$\left(\frac{C}{N}\right)_{rx2} = \frac{1}{\frac{1}{\left(\frac{C}{N}\right)_{up\_MRT}} + \frac{1}{\left(\frac{C}{N}\right)_{down\_MRT\_to\_MRT}}}.$$ FLA Equation 2

In this equation, $$\left(\frac{C}{N}\right)_{up\_MRT}$$

610 represents an uplink C/N between reference terminal 140 and satellite 105 and $$\left(\frac{C}{N}\right)_{down\_MRT\_to\_MRT}$$

630 represents a downlink C/N between reference terminal 140 and itself via satellite 105. FLA equation 2 may be used along with several other similar FLA equations (such as FLA equations 1, 3, and 4) and several link performance difference metric equations (such as FLA equations 5 and 6) to solve for the individual terminal uplink and downlink carrier-to-noise ratios for the communication system. In some embodiments, bursts 616 and 635 may be reference bursts.

Figure 6C:
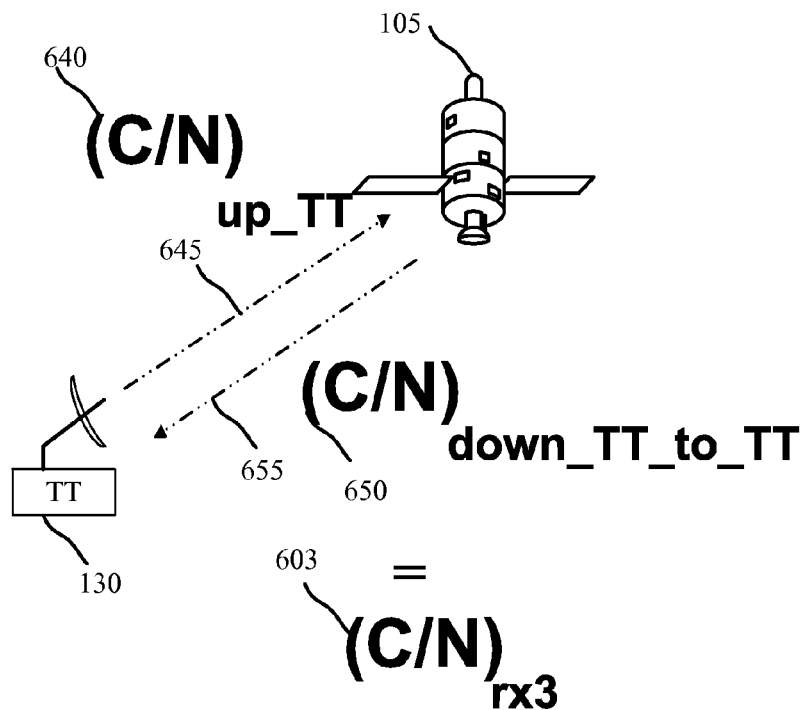
FIG. 6C is a block diagram of a satellite communication system involving communication between a reference terminal and a terminal as part of a fixed link adaptation mechanism, in accordance with various embodiments.

FIG. 6C shows burst 645 being sent up from terminal 130 to satellite 105 and then burst 655 back down to the same terminal 130. In a similar fashion as discussed with FIGS. 6A-B, a carrier-to-noise ratio $$\left(\frac{C}{N}\right)_{rx3}$$

603 for the total communication link between terminal 130 and itself may be measured $$\left(\frac{C}{N}\right)_{rx3}$$

603 may then provide the left-hand side of an equation such as FLA equation 3:

$$\left(\frac{C}{N}\right)_{rx3} = \frac{1}{\frac{1}{\left(\frac{C}{N}\right)_{up\_TT}} + \frac{1}{\left(\frac{C}{N}\right)_{down\_TT\_to\_TT}}}.$$ FLA Equation 3

In this equation, $$\left(\frac{C}{N}\right)_{up\_TT}$$

640 represents an uplink C/N between terminal 130 and satellite 105 and $$\left(\frac{C}{N}\right)_{down\_TT\_to\_TT}$$

650 represents a downlink C/N between terminal 130 and itself via satellite 105. FLA equation 3 may be used along with several other similar FLA equations (such as FLA equations 1, 2, and 4) and several link performance difference metric equations (such as FLA equations 5 and 6), to solve the individual terminal uplink and downlink carrier-to-noise ratios for the communication system. In some embodiments, bursts 645 and 655 may be control and/or signal bursts.

Figure 6D:
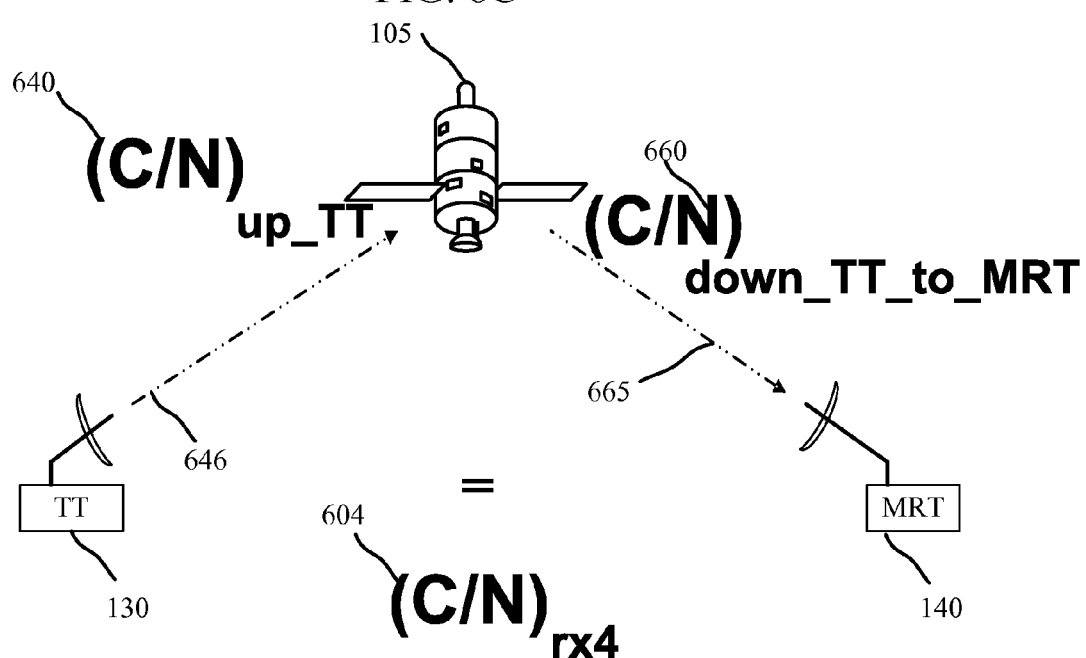
FIG. 6D is a block diagram of a satellite communication system involving communication between a terminal and itself as part of a fixed link adaptation mechanism, in accordance with various embodiments.

FIG. 6D shows burst 646 being sent up from terminal 130 to satellite 105 and then burst 665 back down to reference terminal 140. In a similar fashion as discussed with FIGS. 6A-C, a carrier-to-noise ratio $$\left(\frac{C}{N}\right)_{rx4}$$

604 for the total communication link between terminal 130 and reference terminal 140 may be measured.

$$\left(\frac{C}{N}\right)_{rx4}$$

604 may then provide the left-hand side of an equation such as FLA equation 4:

$$\left(\frac{C}{N}\right)_{rx4} = \frac{1}{\frac{1}{\left(\frac{C}{N}\right)_{up\_TT}} + \frac{1}{\left(\frac{C}{N}\right)_{down\_TT\_to\_MRT}}}.$$ FLA Equation 4

In this equation, $$\left(\frac{C}{N}\right)_{up\_TT}$$

640 represents an uplink C/N between terminal 130 and satellite 105 and $$\left(\frac{C}{N}\right)_{down\_TT\_to\_MRT}$$

660 represents a downlink C/N between terminal 130 and reference terminal 140 via satellite 105. FLA equation 4 may be used along with several other similar FLA equations (such as FLA equations 1, 2, and 3) and several link performance difference metric equations (such as FLA equations 5 and 6) to solve for the individual terminal uplink and downlink carrier-to-noise ratios for the communication system. In some embodiments, bursts 646 and 665 may be control and/or signal bursts.

The order that these bursts are transmitted may vary. Furthermore, a burst sent from terminal 130 may be received by the same terminal 130 and reference terminal 140. Similarly, a burst sent from reference terminal 140 may be received by the same reference terminal 140 and terminal 130. Thus, in some embodiments, bursts 615 and 616 may be the same burst. Similarly, in some embodiments, bursts 645 and 646 may be the same burst.

Using measured performances, such as $$\left(\frac{C}{N}\right)_{rx}$$

601, 602, 603, and 604, from the received signals seen in FIGS. 6A-D, individual terminal uplink and downlink performance measures may be determined. Equations such as FLA equations 1, 2, 3, and 4 may be used to help determine these individual link parameters. As mentioned above, the left-hand side of each FLA equation may be measured, giving respective values $$\left(\frac{C}{N}\right)_{rx}$$

601, 602, 603, and 604. In some embodiments, additional equations may be used to solve for all individual terminal uplink and downlink performance measures. These equations may include the following equations that involve link performance difference metrics as discussed in this application:

$$\left(\Delta\frac{C}{N}\right)_{down\_TT} = \left(\frac{C}{N}\right)_{down\_MRT\_to\_MRT} - \left(\frac{C}{N}\right)_{down\_MRT\_to\_TT} \quad \text{FLA equation 5}$$

$$\left(\Delta\frac{C}{N}\right)_{down\_TT} = \left(\frac{C}{N}\right)_{down\_TT\_to\_MRT} - \left(\frac{C}{N}\right)_{down\_TT\_to\_TT}. \quad \text{FLA equation 6}$$

The left-hand side of the FLA equations 5 and 6 represent link performance difference metrics that may be provided or otherwise input in different ways. As discussed more thoroughly above, determining a link performance difference metric for terminal 130 may include, but is not limited to, determining a system temperature, beam strength, and/or antenna gain at terminal 130 relative to the system temperature, beam strength, and/or antenna gain at reference terminal 140.

In some embodiments, FLA equations may be used to solve for the following variables, as shown in FIGS. 6A-D:

an uplink C/N 640 for terminal 130, $$\left(\frac{C}{N}\right)_{up\_TT};$$

an uplink C/N 610 for reference terminal 140, $$\left(\frac{C}{N}\right)_{up\_MRT};$$

a downlink C/N 660 for terminal 130 to reference terminal 140, $$\left(\frac{C}{N}\right)_{down\_TT\_to\_MRT};$$

a downlink C/N 650 for terminal 130 to terminal 130, $$\left(\frac{C}{N}\right)_{down\_TT\_to\_TT};$$

a downlink C/N 630 for reference terminal 140 to reference terminal 140

$$\left(\frac{C}{N}\right)_{down\_MRT\_to\_MRT};$$

and/or a downlink C/N 620 for reference terminal 140 to terminal 130, $$\left(\frac{C}{N}\right)_{down\_MRT\_to\_TT}.$$

One skilled in the art will recognize that other measures of uplink and downlink performance may be utilized in the spirit of this invention, including but not limited to, performance measures such as SNR, Eb/No, and BER.

Figure 7A:
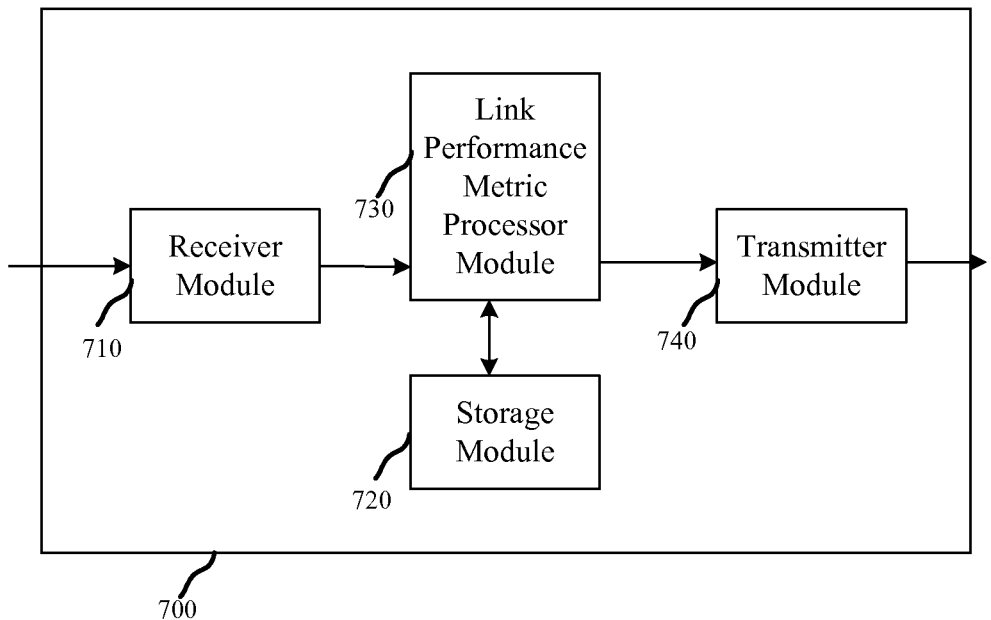
FIG. 7A is a block diagram of a satellite communication device, in accordance with various embodiments.

FIG. 7A is a block diagram of a satellite communication device 700 for determining link information between terminals in a satellite communication network. Device 700 may be implemented within systems such as system 100 of FIG. 1 and/or systems of FIGS. 6A-6D and may be implemented with methods 800 of FIG. 8 and methods 900 of FIG. 9 as discussed in more detail below. In some embodiments, device 700 may be part of a terminal, such as terminal 130 or reference terminal 140. In some embodiments, device 700 may be part of a satellite, such as satellite 105. In some embodiments, device 700 may be part of a control center, such as control center 160.

Device 700 may include different modules, such as receiver module 710, storage module 720, link performance metric processor module, 730, and/or transmitter module 740. Device 700 may include other modules. Receiver module 710 may receive different information from the satellite communication network, including information from terminals 130, reference terminals 140, and satellite 105. For example, receiver module 710 may receive link performance metrics from different terminals 130, 140, and/or satellite 105. Information received at receiver module 710 may be stored on storage module 720. Storage module 720 may also store other information, such as link performance difference metrics, merely by way of example. Link performance metric processor module 730 may provide a variety of functions, including, but not limited to, determining link performance difference metrics and calculating link performance metrics between different terminals. Device 700 may also include a transmitter module 740. Transmitter module 740 may transmit different information into the satellite communication network. For example, transmitter module 740 may transmit link performance metrics and/or link performance difference metrics, merely by way of example. These modules may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 7B:
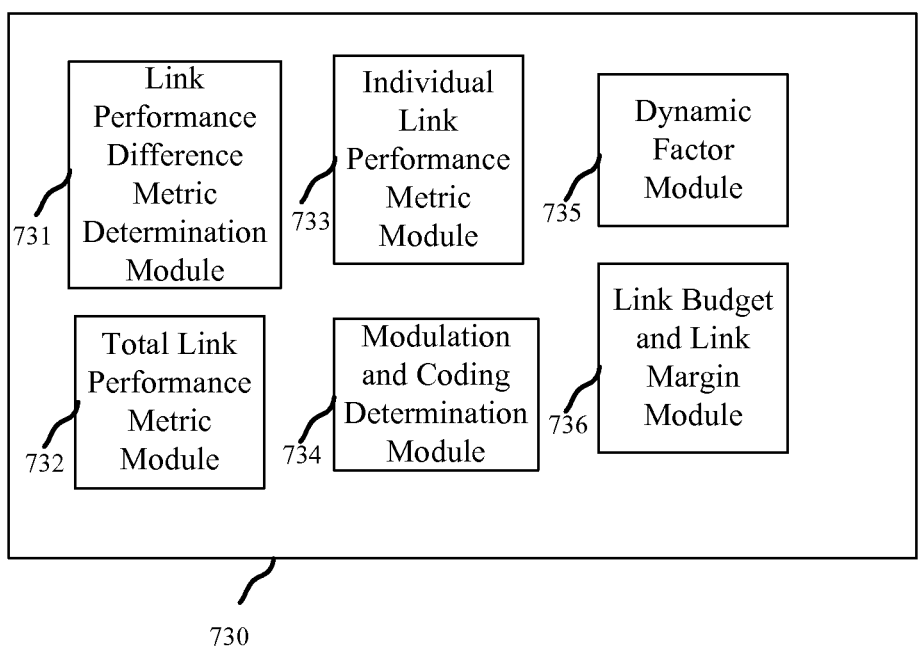
FIG. 7B is a block diagram of a link performance metric processor module that may be part of a satellite communication device, in accordance with various embodiments.

FIG. 7B is a block diagram of a link performance metric processor module, such as module 730, of satellite communication device 700 of FIG. 7A. Link performance metric processor module 730 may include different modules, including, but not limited to, link performance difference metric module 731, total link performance metric module 732, individual link performance metric module 733, modulation and/or coding determination module 734, dynamic factor module 735, and/or link budget and/or link margin module 736. Link performance difference metric module 731 may determine the difference between link performance metrics it may receive from receiver module 710 and/or storage module 720. Total link performance metric module 732 may determine link performance metrics that may include both an uplink and downlink component. Individual link performance metric module 733 may determine link performance metrics such as uplink performance metrics and/or downlink performance metrics. Modulation and/or coding determination module 734 may determine modulation and/or coding for signals sent between terminals and satellites based on link performance metrics. Dynamic factor module 735 may determine dynamic factors such as rain fade factors for uplink and/or downlink signals that may be taken into account when determining link performance metrics. Link budget and/or link margin module 736 may determine link budgets and/or link margins based on different factors such as link performance metrics. These modules may be utilized to implement methods such as method 800 of FIG. 8 and method 900 of FIG. 9 below.

Figure 8:
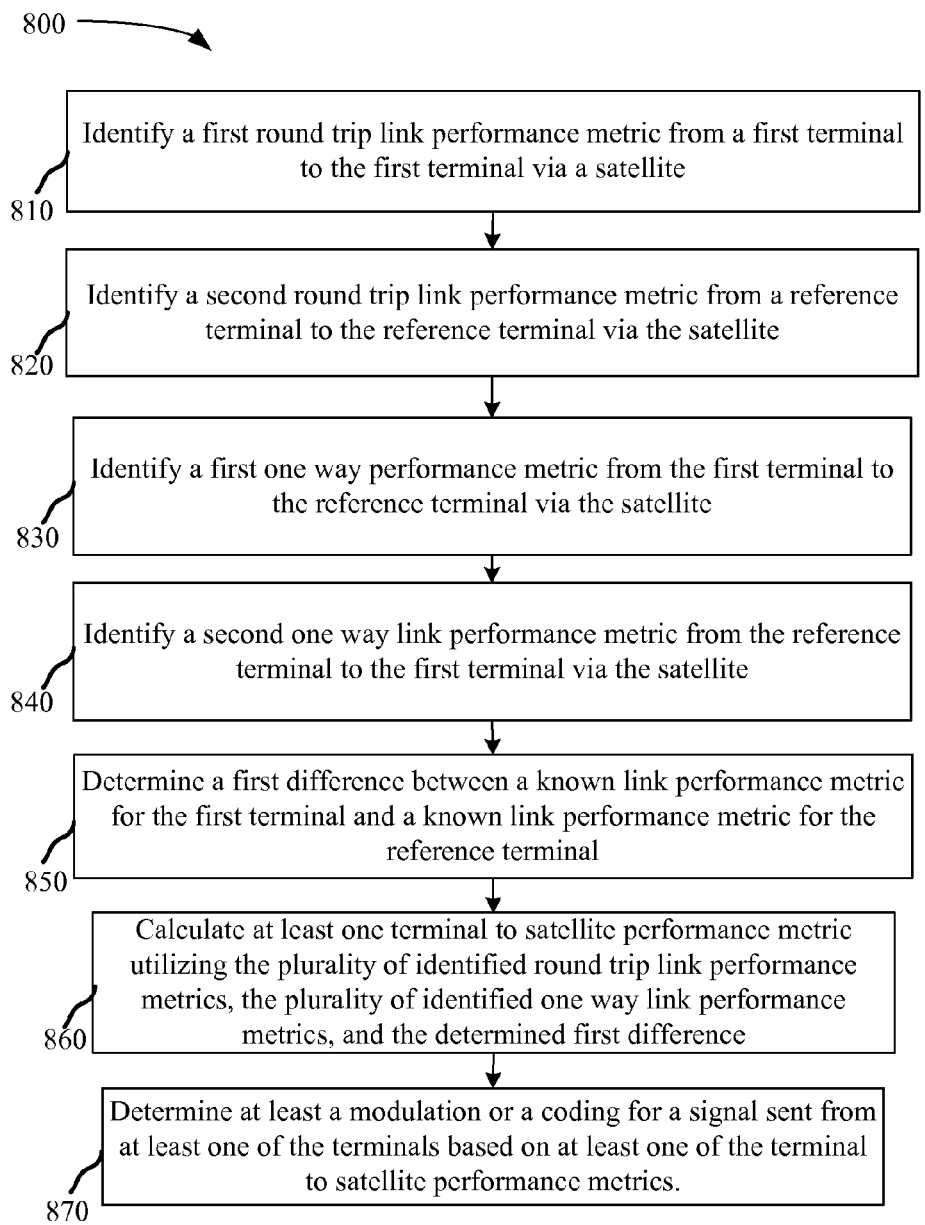
FIG. 8 is a flow diagram of a method of fixed link adaptation, in accordance with various embodiments.

FIG. 8 is a block diagram of method 800 for determining link performance metrics for terminals in a satellite communication network. Link information may include link performance metrics and link performance difference metrics, merely by way of example. Method 800 may be implemented on systems such as system 100 of FIG. 1 and systems of FIG. 6A, FIG. 6B, FIG. 6C, and FIG. 6D. Method 800 may also be implemented using devices such as device 700 of FIG. 7A and FIG. 7B.

At block 810, a first round trip link performance metric from a first terminal to the first terminal via a satellite may be identified. At block 820, a second round trip link performance metric from a reference terminal to the reference terminal via the satellite may be identified.

At block 830, a first one way performance metric from the first terminal to the reference terminal via the satellite may be identified. At block 840, a second one-way link performance metric from the reference terminal to the first terminal via the satellite may be identified.

In some embodiments, identifying the performance metrics in block 810, 820, 830, and/or 840 may include identifying at least one link performance metric using at least one communication burst that is part of regular communication between terminals. In some embodiments, a communication burst that is part of regular communication between terminals may be a reference burst from the reference terminal, a control burst from the first terminal, or a signal burst from the first terminal.

In some embodiments, identifying the performance metrics in block 810, 820, 830, and/or 840 may include identifying the performance metrics under clear sky conditions. In some cases, the performance metrics may be identified under dynamic conditions, such as rain fade conditions.

At block 850, a first difference between a known link performance metric for the first terminal and a known link performance metric for the reference terminal may be determined.

At block 860, at least one terminal-to-satellite performance metric may be calculated utilizing the plurality of identified round trip link performance metrics, the plurality of identified one-way link performance metrics, and the determined first difference may be calculated. In some embodiments, calculating the at least one terminal-to-satellite link performance metric may include calculating at least an uplink performance metric for the first terminal, an uplink performance metric for the reference terminal, a downlink performance metric for the first terminal, or a downlink performance metric for the reference terminal.

At block 870, at least a modulation or a coding for a signal sent from at least one of the terminals based on at least one of the terminal-to-satellite performance metrics may be determined.

Some embodiments may also involve determining a second difference between a known link performance metric for a second terminal and a known link performance metric for the reference terminal. A third one-way link performance metric from the first terminal to the second terminal via the satellite using a plurality of terminal-to-satellite performance metrics and the second determined difference may be calculated.

Figure 9:
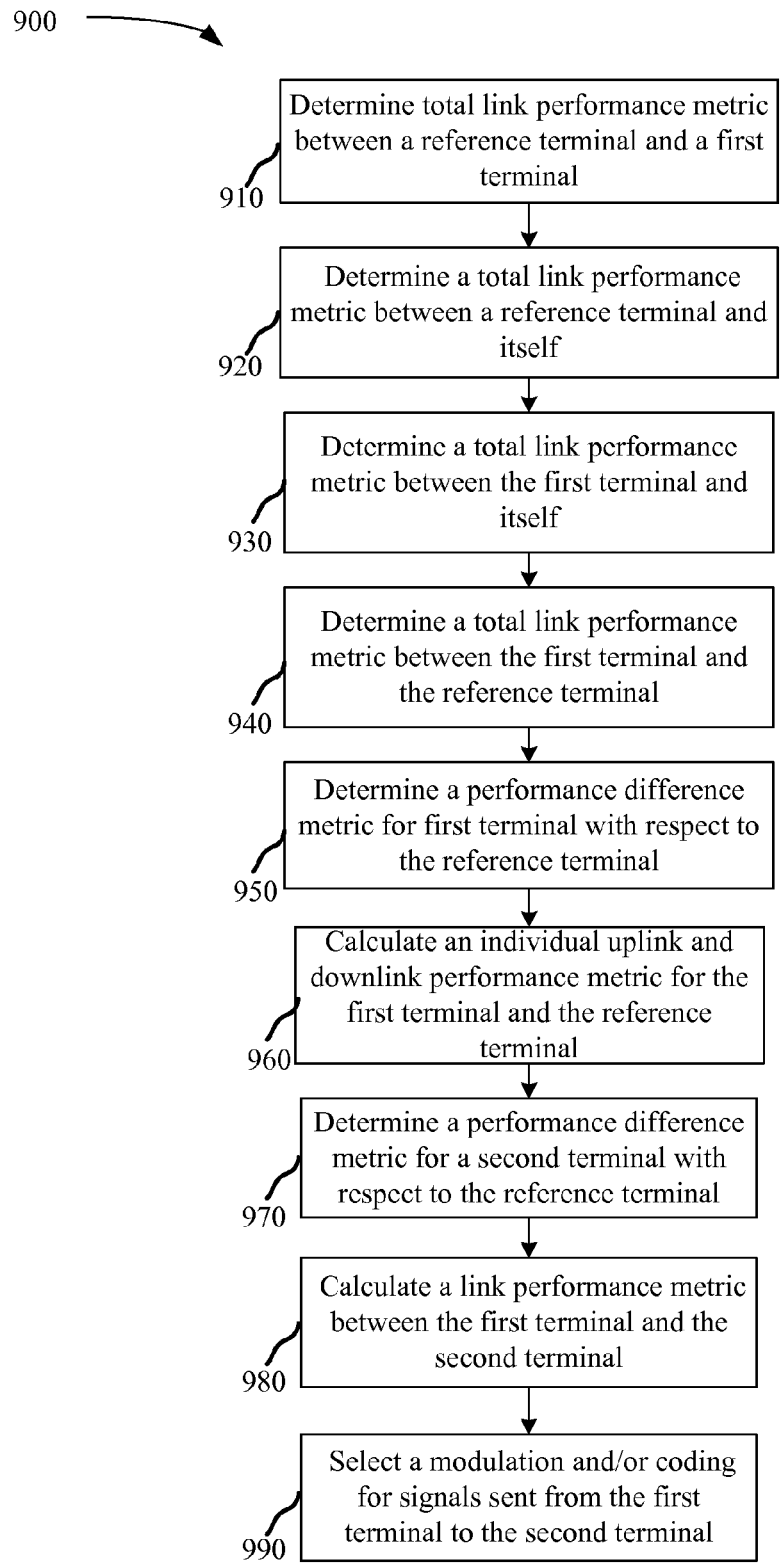
FIG. 9 is a flow diagram of a method of fixed link adaptation, in accordance with various embodiments.

FIG. 9 shows one embodiment of a method 900 of performing FLA, which may be implemented on system 100 of FIG. 1 and systems of FIG. 6A, FIG. 6B, FIG. 6C, and FIG. 6D. Method 900 may also be implemented using devices such as device 700 of FIG. 7A and FIG. 7B.

At block 910, a total link performance metric between a reference terminal and a first terminal is determined. At block 920, a total link performance metric is determined between a reference terminal and itself. At block 930, a total link performance metric is determined between the first terminal and itself. At block 940, a total link performance metric is determined between the first terminal and the reference terminal. For each of blocks 910, 920, 930, and 940, a measure of total link performance metric may be a measure of a total carrier-to-noise ratio between the respective terminals involved at each block. At block 950, link performance difference metrics are determined for the first terminal with respect to the reference terminal. In some embodiments, this may be a delta C/N metric. Utilizing the information determined in blocks 910, 920, 930, 940, and 950, individual uplink and downlink measures of performance may be determined at block 960 for the first terminal and the reference terminal. Again, these measures of performance may be C/Ns in some embodiments. At block 970, a link performance difference metric may be determined for a second terminal. A link performance difference metric for the second terminal may be a delta C/N parameter. At block 980, a link performance metric between the first and second terminals may be calculated using information determined from the previous steps. Link performance metrics again may be measured in terms of C/N in some embodiments. Total link and downlink performance metrics may be determined. Based on the link performance information determined in the previous steps, modulation and coding for signals between the first and second terminals may be determined at block 990. In some embodiments, modulation and coding may be determined that optimizes the uplink, downlink, and/or total link.

Merely by way of example, the following description provides an example use of FLA methods, systems, and devices disclosed herein. This example shows how a total link performance may be used between two terminals, such as a first terminal ("TT1") and a second terminal ("TT2"), where the first terminal and the second terminal may be terminals such as 130-*a*-1 and 130-*a*-2 of system 100 of FIG. 1. In some embodiments, this may be characterized as a carrier-to-noise ratio, which may be represented as $$\left(\frac{C}{N}\right)_{rx\_TT1\_to\_TT2}.$$

To determine $$\left(\frac{C}{N}\right)_{rx\_TT1\_to\_TT2},$$

several variables may be used. These variables may be determined by solving the FLA equations such as FLA equation 1 through FLA equation 6, provided above. An uplink performance metric, such as a C/N for a signal sent from the first terminal to a satellite transponder may be used, which may be referred to as $$\left(\frac{C}{N}\right)_{up\_TT1}.$$

In addition, a downlink performance metric, such as a C/N, may be based on a signal transmitted from the first terminal to a satellite and then down to a reference terminal. This may be referred to as $$\left(\frac{C}{N}\right)_{down\_TT1\_to\_MRT}.$$

Both of these may be calculated as part of the FLA calculation as described above. In addition, a link performance difference metric such as a delta C/N metric may be determined for the second terminal. In some embodiments, this may be characterized as $$\left(\Delta\frac{C}{N}\right)_{down\_TT2} \cdot \left(\Delta\frac{C}{N}\right)_{down\_TT2}$$

may be determined in numerous ways, as described above. Merely by way of example, $$\left(\Delta\frac{C}{N}\right)_{down\_TT2}$$

may be input by an operator as a footprint and/or beam strength and downlink antenna gain and/or system temperature modifier for the second terminal with respect to the reference terminal. Based on these factors, a total link performance $$\left(\frac{C}{N}\right)_{rx\_TT1\_to\_TT2}$$

may be determined for clear sky conditions using the following equation for example:

$$\left(\frac{C}{N}\right)_{rx\_TT1\_to\_TT2} = \frac{1}{\frac{1}{\left(\frac{C}{N}\right)_{up\_TT1}} + \frac{1}{\left(\Delta\frac{C}{N}\right)_{down\_TT2}\left(\frac{C}{N}\right)_{down\_TT1\_to\_MRT}}}.$$

In some embodiments, a rain fade margin may be included in an FLA. This may be represented as $$\left(\frac{C}{N}\right)_{Margin}.$$

A rain fade margin may be determined for each terminal, or for a network, in various embodiments. In some embodiments, an operator may input the rain fade margin. A rain fade margin may also be built into a link performance difference metric, such as $$\left(\Delta\frac{C}{N}\right)_{down\_TT2}.$$

A measure of the link performance including a rain fade margin may then be determined. In some embodiments, this may be a worst case link performance, measured as a C/N:

$$\left(\frac{C}{N}\right)_{rx\_worst\_case} = \left(\frac{C}{N}\right)_{rx} - \left(\frac{C}{N}\right)_{Margin}.$$

Modcode determinations for signals sent between two terminals, such as the first terminal and the second terminal, may then be determined based on $$\left(\frac{C}{N}\right)_{rx\_TT1\_to\_TT2}.$$

In some embodiments, modcodes may be decided based on $$\left(\frac{C}{N}\right)_{rx\_worst\_case}.$$

The following provides another embodiment of an FLA method. This may be implemented for a satellite communication system, such as system 100 of FIG. 1.

An expected received C/N for clear sky conditions may be input (e.g., based on a reference burst at a reference terminal, such as reference terminal 140 of FIG. 1). An operator may input this information (e.g., through a Network Management System). A link performance metric may be described as $$\left(\frac{C}{N}\right)_{rx\_MRT\_to\_MRT},$$

where rx reflects that the reference burst makes a total trip, up from the reference terminal to a satellite and then back down to the reference terminal. An operator may also input $$\left(\frac{C}{N}\right)_{up\_MRT} \text{ and } \left(\frac{C}{N}\right)_{down\_MRT\_to\_MRT} \cdot \left(\frac{C}{N}\right)_{rx\_MRT\_to\_MRT}$$

for a reference burst may be measured and achieved through an automated and/or manual transmitter power ramp up of the reference terminal in clear sky conditions.

Some time after a terminal, such as terminal 130 of system 100 of FIG. 1, comes up, it may also go through a similar automated and/or manual power ramp up in clear sky conditions. In some embodiments, these power ramp ups may occur before a default modcode may be utilized. The transmitter power for a terminal may be increased at the terminal until bursts from the terminal are seen at the reference terminal with the received $$\left(\frac{C}{N}\right)_{rx\_MRT\_to\_MRT}.$$

This may ensure that the terminal hits the satellite with the same power as the reference terminal hits the satellite. The terminals may hit the satellite with the same transmit power with less than or equal to 1 dB back-off from P1 dB. Link budgets and/or link performance measures may be determined for terminals that reach 1 dB back-off from P1 dB before $$\left(\frac{C}{N}\right)_{rx\_MRT\_to\_MRT}$$

is achieved.

$$\left(\frac{C}{N}\right)_{rx\_TT\_to\_MRT}, \left(\frac{C}{N}\right)_{up\_TT}, \text{ and } \left(\frac{C}{N}\right)_{down\_TT\_to\_MRT}$$

for such terminals may be input by an operator.

Link budget and transmission power calibrations may be used to determine $$\left(\frac{C}{N}\right)_{up\_TT} \text{ and } \left(\frac{C}{N}\right)_{down\_TT\_to\_MRT}$$

for the terminals. A reference burst received by the reference terminal and any other terminal under clear sky conditions may be used to determine a performance difference parameter for the terminal, such as $$\left(\Delta\frac{C}{N}\right)_{down\_TT},$$

by measuring the received carrier-to-noise ratio for the reference burst at the terminal and the reference terminal. As discussed above, a link performance difference metric may be determined in numerous different ways, including but not limited to being approximated based on hardware differences between a terminal and a reference terminal.

From the information determined using a method of FLA, $$\left(\frac{C}{N}\right)_{up\_MRT} \text{ and } \left(\frac{C}{N}\right)_{down\_MRT\_to\_MRT}$$

may be determined. In addition, $$\left(\frac{C}{N}\right)_{up\_TT} \text{ and } \left(\frac{C}{N}\right)_{down\_TT\_to\_MRT}$$

may be known for every terminal, including a reference terminal. Other measures of link performance may also be determined as discussed with respect to the other embodiments of FLA.

Overall, embodiments of FLA provide methods, systems, and devices for determining measures of link performance between two terminals, such as $$\left(\frac{C}{N}\right)_{rx\_TT1\_to\_TT2}.$$

In some embodiments, these measures of link performance may be determined before determining an optimum modcode for a communication link and without first having to establish a link between the two terminals. FLA may involve inputting a performance difference parameter. For example, a link performance difference metric may be $$\left(\Delta\frac{C}{N}\right)_{down\_TT},$$

indicating how much the beam strength, antenna gain, and/or system temperature is different on a terminal site from the reference terminal. Combined with link performance information, using bursts transmitted between a terminal and a reference terminal along with equations, such as the six FLA equations, may result in uplink and downlink performance determinations for a terminal and a reference terminal.

$$\left(\frac{C}{N}\right)_{rx\_TT1\_to\_TT2}$$

may then be determined.

In some embodiments, a manual FLA can be utilized. A manual FLA may reduce error in some cases. For manual FLA, parameters may be input for each terminal. In some embodiments, an operator inputs the parameters. Merely by way of example, an uplink performance measure for a first terminal 130-a-1, such as $$\left(\frac{C}{N}\right)_{up\_TT1},$$

may be determined from a link budget for groups of terminals. A downlink performance measure for first terminal 130-a-1 to a reference terminal 140, such as $$\left(\frac{C}{N}\right)_{down\_TT1\_to\_MRT},$$

may be determined from a link budget. A link performance difference metric, such as $$\left(\Delta\frac{C}{N}\right)_{down\_TT2},$$

may be determined for groups of terminals. Then for a first terminal 130-a-1 and a second terminal 130-a-2, an equation such as the following equation may be used to determine the link performance between the terminals, for example:

$$\left(\frac{C}{N}\right)_{rx} = \frac{1}{\frac{1}{\left(\frac{C}{N}\right)_{up\_TT1}} + \frac{1}{\left(\Delta\frac{C}{N}\right)_{down\_TT2}\left(\frac{C}{N}\right)_{down\_TT1\_to\_MRT}}}.$$

These measures of a link performance difference metric, such as a delta C/N metric, may be represented by equations such as the following, as discussed more thoroughly above:

$$\left(\Delta\frac{C}{N}\right)_{down\_TT} = \left(\frac{C}{N}\right)_{down\_TT\_to\_MRT} - \left(\frac{C}{N}\right)_{down\_TT\_to\_TT}$$

$$\left(\Delta\frac{C}{N}\right)_{down\_TT} = \left(\frac{C}{N}\right)_{down\_MRT\_to\_MRT} - \left(\frac{C}{N}\right)_{down\_MRT\_to\_TT}.$$

3. Dynamic Link Adaptation:

Methods, systems, and devices are disclosed involving a dynamic link adaptation mechanism ("DLA"). DLA may involve link performance conditions that make the conditions deviate from clear sky conditions, such as time-varying channel conditions. Merely by way of example, DLA may take into account rain fade or other factors that may impact link conditions dynamically.

DLA may be built upon FLA, and may also utilize link performance different metrics, such as delta C/N metrics. DLA may take advantage of reference bursts, control bursts, and/or signal bursts that are transmitted between terminals, including a reference terminal. In some embodiments, DLA may not involve additional traffic for a communication system. DLA may provide dynamic link performance information that may be used to decide modcodes for transmission between terminals before first establishing a link between the terminals.

For example, embodiments of DLA may include the satellite communication system configured to determine link performance metrics for terminals in a satellite communication system as discussed above with respect to FLA. In addition, embodiments may include the control center further configured to identify a one-way link performance metric from the reference terminal to the reference terminal via the satellite under dynamic conditions. The control center may be configured to calculate a dynamic link factor for the reference terminal based on an identified round trip link performance metric and the plurality of link performance metrics determined under clear sky conditions.

Some embodiments of the satellite communication system configured to determine link performance metrics for terminals in a satellite communication system may include the control center further configured to identify a one-way link performance metric from the first terminal to the reference terminal via the satellite under dynamic conditions. The control center may be configured to calculate a dynamic link factor for the first terminal based on the identified one-way link performance metric and the plurality of link performance metrics identified under clear sky conditions.

Some embodiments of the satellite communication system configured to determine link performance metrics for terminals in a satellite communication system may include the control center further configured to identify a one-way link performance metric from a second terminal to the reference terminal via the satellite under clear sky conditions. The control center may be configured to identify a one-way link performance metric from the reference terminal to the second terminal via the satellite under clear sky conditions. The control center may be configured to identify a one-way link performance metric from the second terminal to the reference terminal via the satellite under dynamic conditions. The control center may be configured to determine a difference between a known link performance metric for the second terminal and a known link performance metric for the reference terminal. The control center may be configured to calculate at least one terminal-to-satellite performance metric utilizing the plurality of identified round trip link performance metrics, the plurality of identified one-way link performance metrics, and the determined second difference. The control center may be configured to calculate a dynamic link factor for the second terminal based on the identified a one-way link performance metric and the plurality of link performance metrics determined under clear sky conditions. The control center may be configured to calculate a round trip link performance metric between the first terminal and the second terminal utilizing the plurality of dynamic link factors.

Some embodiments of the satellite communication system configured to determine link performance metrics for terminals in a satellite communication system may include the control center further configured to determine at least a modulation or a coding for a signal sent from the first terminal to the second terminal utilizing a round trip link performance metric. The control center may be configured to calculate at least one of the dynamic link factors including calculating a rain fade factor.

Figure 10A:
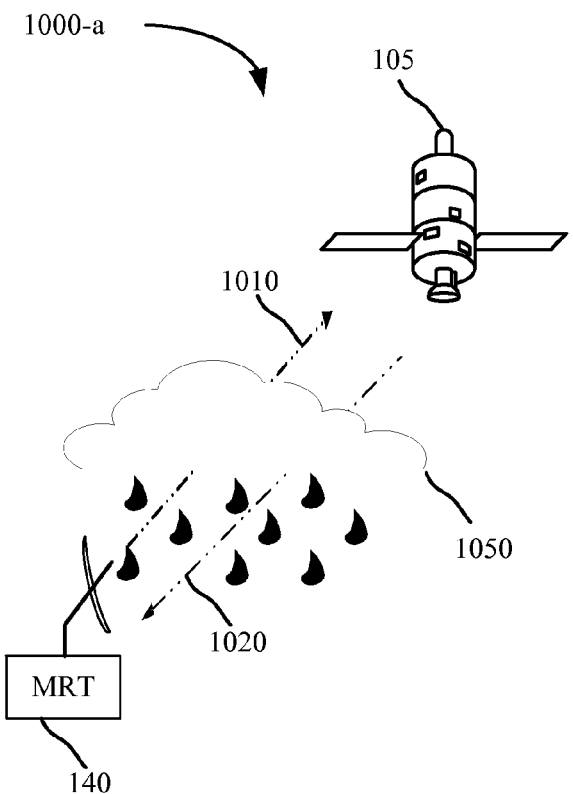
FIG. 10A is a block diagram of a satellite communication system involving communication between a reference terminal and itself as part of a dynamic link adaptation mechanism, in accordance with various embodiments.
Figure 10B:
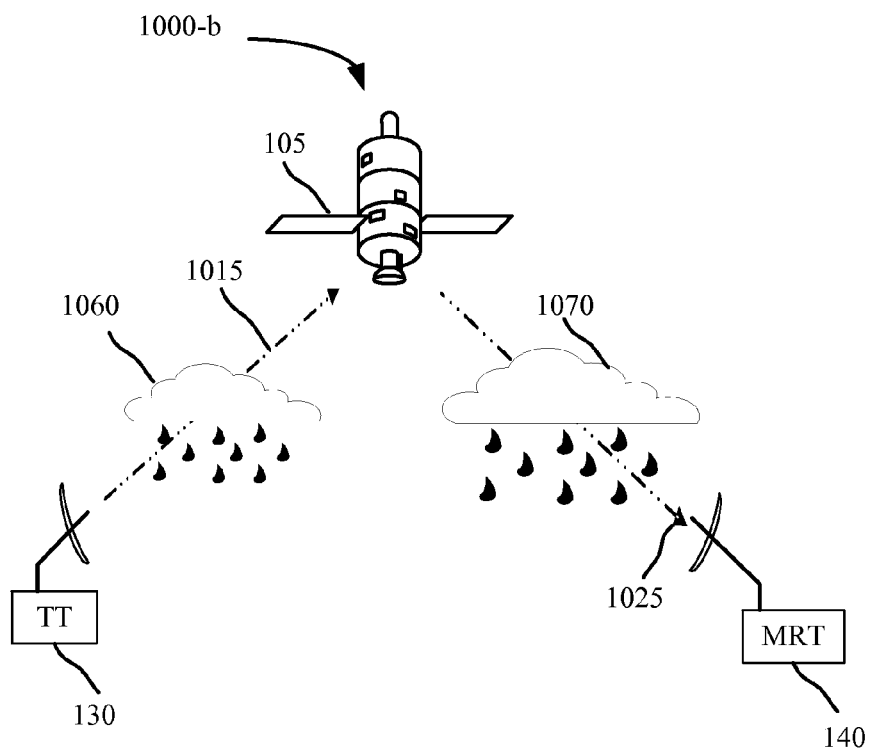
FIG. 10B is a block diagram of a satellite communication system involving communication between a terminal and itself as part of a dynamic link adaptation mechanism, in accordance with various embodiments.

As noted above, DLA may determine dynamic factors, such as a rain fade up and/or a rain fade down factor. FIGS. 10A-B show diagrams of systems 1000-*a* and 1000-*b* that may implement DLA. Systems 1000 may be examples of system 100 of FIG. 1. Systems 1000-*a* and 1000-*b* show embodiments of DLA that utilize bursts transmitted between terminals in order to determine information regarding dynamic conditions and link performance measures under dynamic/time-varying conditions.

System 1000-*a* of FIG. 10A shows burst 1010 that is sent to satellite 105 from reference terminal 140 and then transmitted back down as burst 1020 to the same reference terminal 140. Bursts 1010 and 1020 may be reference bursts. Burst transmission may happen under dynamic conditions 1050 (e.g., rain fade conditions). Received burst 1020 may be used to determine a measure of the total or round trip link performance between reference terminal 140 and itself through the dynamic condition 1050. This may be represented as carrier-to-noise ratio such as a $$\left(\frac{C}{N}\right)_{rx}.$$

In some embodiments, the measured $$\left(\frac{C}{N}\right)_{rx}$$

may then be used along with an equation such as DLA equation 1 below to determine dynamic fade up and fade down factors locally at reference terminal 140:

$$\left(\frac{C}{N}\right)_{rx} = \frac{fade_{up\_MRT}}{\frac{1}{\left(\frac{C}{N}\right)_{up\_MRT}} + \frac{1}{fade_{down\_MRT}\left(\frac{C}{N}\right)_{down\_MRT\_to\_MRT}}}.$$  DLA equation 1

Dynamic fade up and fade down factors may be rain fade up and rain fade down factors. Note that DLA equation 1 may also require uplink and downlink performance information, such as $$\left(\frac{C}{N}\right)_{up\_MRT} \text{ and } \left(\frac{C}{N}\right)_{down\_MRT\_to\_MRT},$$

which may be determined using FLA in some embodiments. The rain fade up and down can be related using known scaling techniques based on the differences between up-link and down-link frequencies.

Along with determining dynamic fade up and fade down factors for reference terminal 140, DLA may help determine dynamic fade factors at other terminals. System 1000-*b* of FIG. 10B shows terminal 130 transmitting burst 1015 to satellite 105. Reference terminal 140 may then receive the burst as burst 1025 from terminal 130 via satellite 105. Bursts 1015 and 1025 may be control and/or signal bursts. FIG. 10B may reflect an embodiment showing a transmission from terminal 130 to reference terminal 140 under dynamic conditions 1060 and 1070. A received $$\left(\frac{C}{N}\right)_{rx\_TT\_to\_MRT}$$

may be measured and used to determine dynamic fade factors for terminal 130. This measured received carrier-to-noise ratio may represent the left-hand side of an equation such as DLA equation 2, below. In some embodiments, FLA as described in this application may also provide clear sky $$\left(\frac{C}{N}\right)_{up\_TT} \text{ and } \left(\frac{C}{N}\right)_{down\_TT\_to\_MRT}$$

as seen in an equation such as DLA equation 2 below. As a result, a dynamic fade up factor and fade down factor for terminal 130 may be determined using an equation such as the following DLA equation 2:

$$\left(\frac{C}{N}\right)_{rx} = \frac{fade_{up\_TT}}{\frac{1}{\left(\frac{C}{N}\right)_{up\_TT}} + \frac{1}{fade_{down\_MRT}\left(\frac{C}{N}\right)_{down\_TT\_to\_MRT}}}.$$  DLA equation 2

Figure 11:
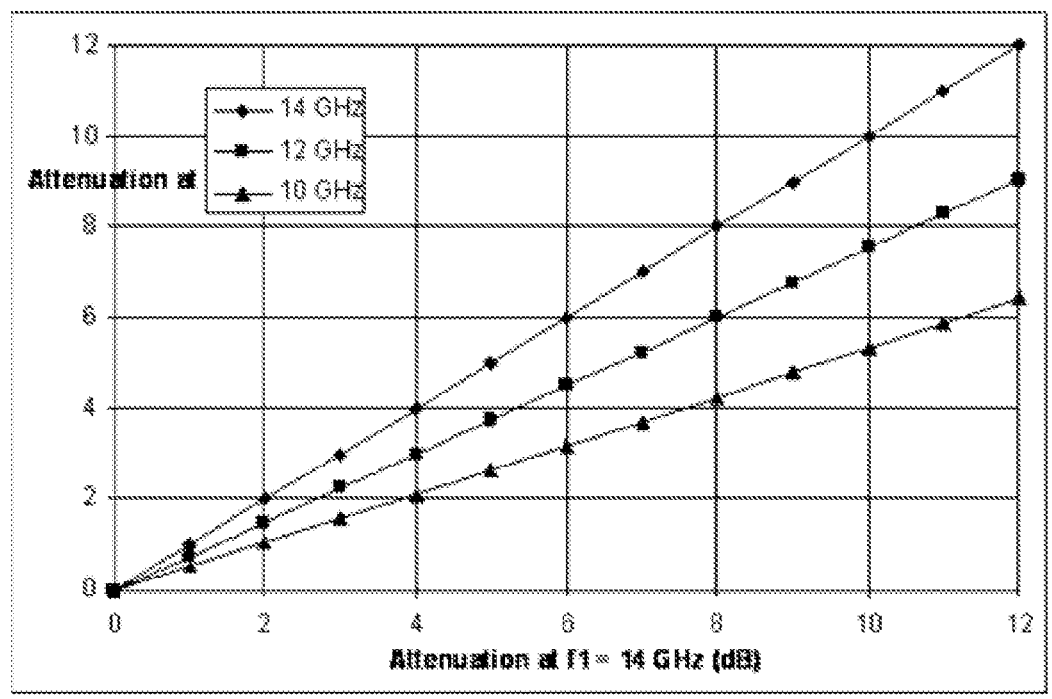
FIG. 11 is a graph relating rain fade factors for uplinks and downlinks in a satellite communication system, in accordance with various embodiments.

In some embodiments, dynamic fade up and fade down factors may be predictably related. Merely by way of example, FIG. 11 provides a graph reflecting relationships between rain fade up and rain fade down factors based on the frequencies of the uplink and the downlink. One skilled in the art will recognize that other relationships may be established relating dynamic fade up and fade down factors. The rain fade up and down can be related using known scaling techniques based on the differences between up-link and down-link frequencies.

In some embodiments of DLA, FLA may provide a measure of the link performance (e.g., carrier-to-noise ratio) for any link (e.g., up, down, and/or total for terminals and reference terminals). DLA may provide fade factors for each terminal including a reference terminal. Combined with link performance difference metrics, as discussed above, calculations may be made to determine individual and/or total link performance between a first terminal and a second terminal using equations such as DLA equations 3 and 4, which will be discussed below.

Figure 12:
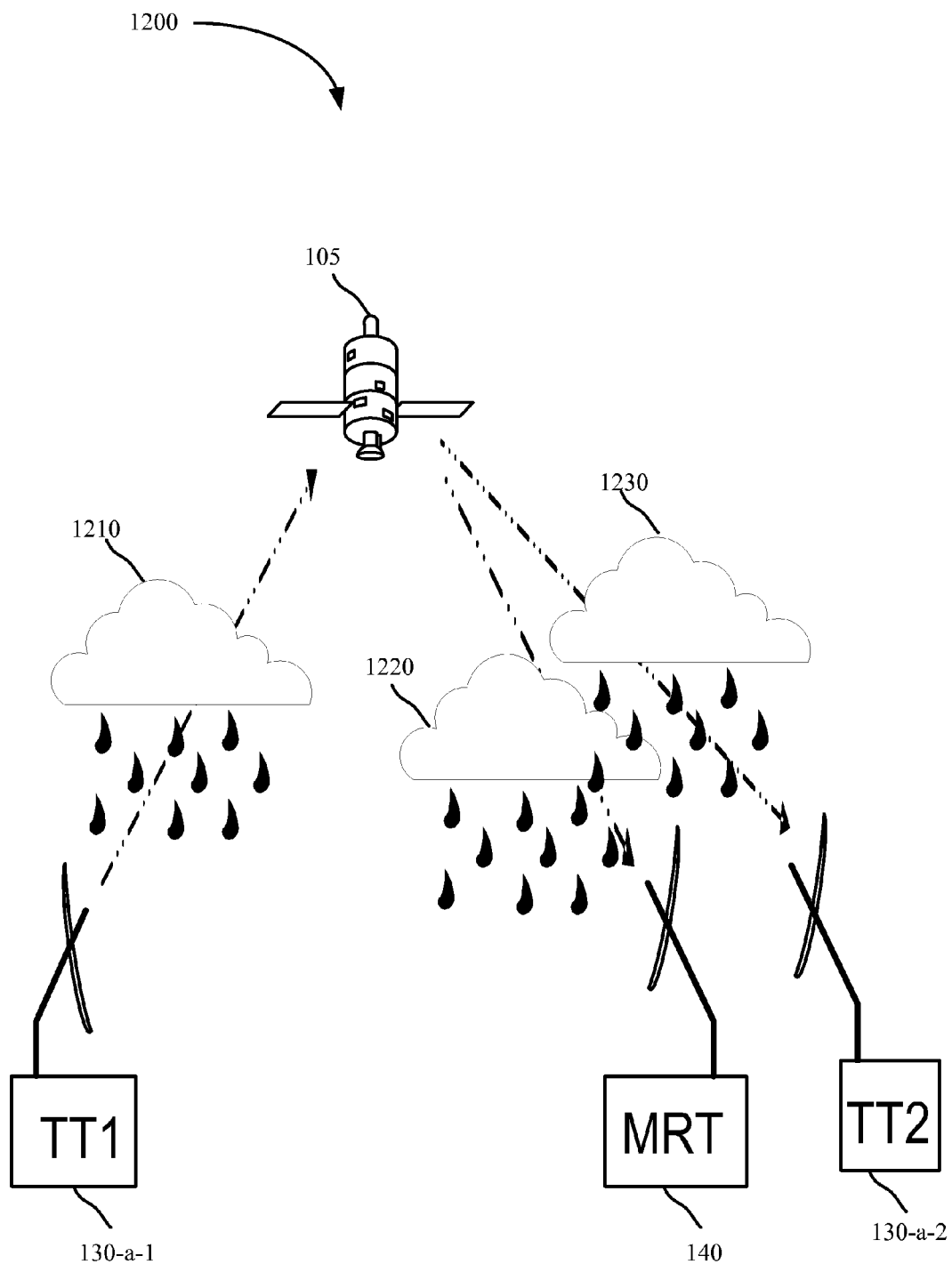
FIG. 12 is a block diagram of a satellite communication system involving communication between several terminals and a reference terminal as part of a dynamic link adaptation mechanism, in accordance with various embodiments.

FIG. 12 shows a block diagram of a system 1200, which may implement DLA. System 1200 may be an example of system 100 of FIG. 1. FIG. 12 shows first terminal 130-*a*-1 ("TT1"), second terminal 130-*a*-2 ("TT2"), and reference terminal 140 ("MRT") under dynamic conditions. FIG. 12 shows an embodiment of DLA where the dynamic conditions between each of the links may be different: Rain fade condition 1210 reflects conditions between terminal 130-*a*-1 and satellite 105; rain fade condition 1220 reflects conditions between satellite 105 and reference terminal 140; and rain fade condition 1230 reflects conditions between satellite 105 and terminal 130-*a*-2.

As discussed in reference to FIGS. 10A-B, bursts from reference terminal 140 and terminals such as 130-*a*-1 and 130-*a*-2 may be used to determine dynamic fade factors for each uplink and downlink for each terminal. The order that these bursts are transmitted may not matter. Furthermore, a burst sent from a terminal may be received by the same terminal and a reference terminal. Similarly, a burst sent from a reference terminal may be received by the same reference terminal and another terminal.

As a result, the following DLA equation 3 may be used in some embodiments to determine a total link performance and/or link budget between terminal 130-*a*-1 and terminal 130-*a*-2 utilizing the determined dynamic fade factors, such as rain fade factors, along with a link performance difference metric for terminal 130-*a*-2:

$$\left(\frac{C}{N}\right)_{rx\_TT1\_to\_TT2} = \frac{fade_{up\_TT1}}{\dfrac{1}{\left(\dfrac{C}{N}\right)_{up\_TT1}} + \dfrac{1}{fade_{down\_TT2}\left(\Delta\dfrac{C}{N}\right)_{down\_TT2} fade_{down\_MRT}\left(\dfrac{C}{N}\right)_{down\_TT1\_to\_MRT}}} \quad \text{DLA equation 3}$$

In some embodiments, measures of downlink performance from terminal 130-*a*-1 and terminal 130-*a*-2 may also be determined using equations such as the following:

$$\left(\frac{C}{N}\right)_{down\_TT1\_to\_TT2} = fade_{down\_TT2}\left(\Delta\frac{C}{N}\right)_{down\_TT2} fade_{down\_MRT}\left(\frac{C}{N}\right)_{down\_TT1\_to\_MRT}. \quad \text{DLA equation 4}$$

Utilizing the difference measures of link performance under dynamic conditions, modulation and coding decisions may be made for signals sent between different terminals.

Figure 13:
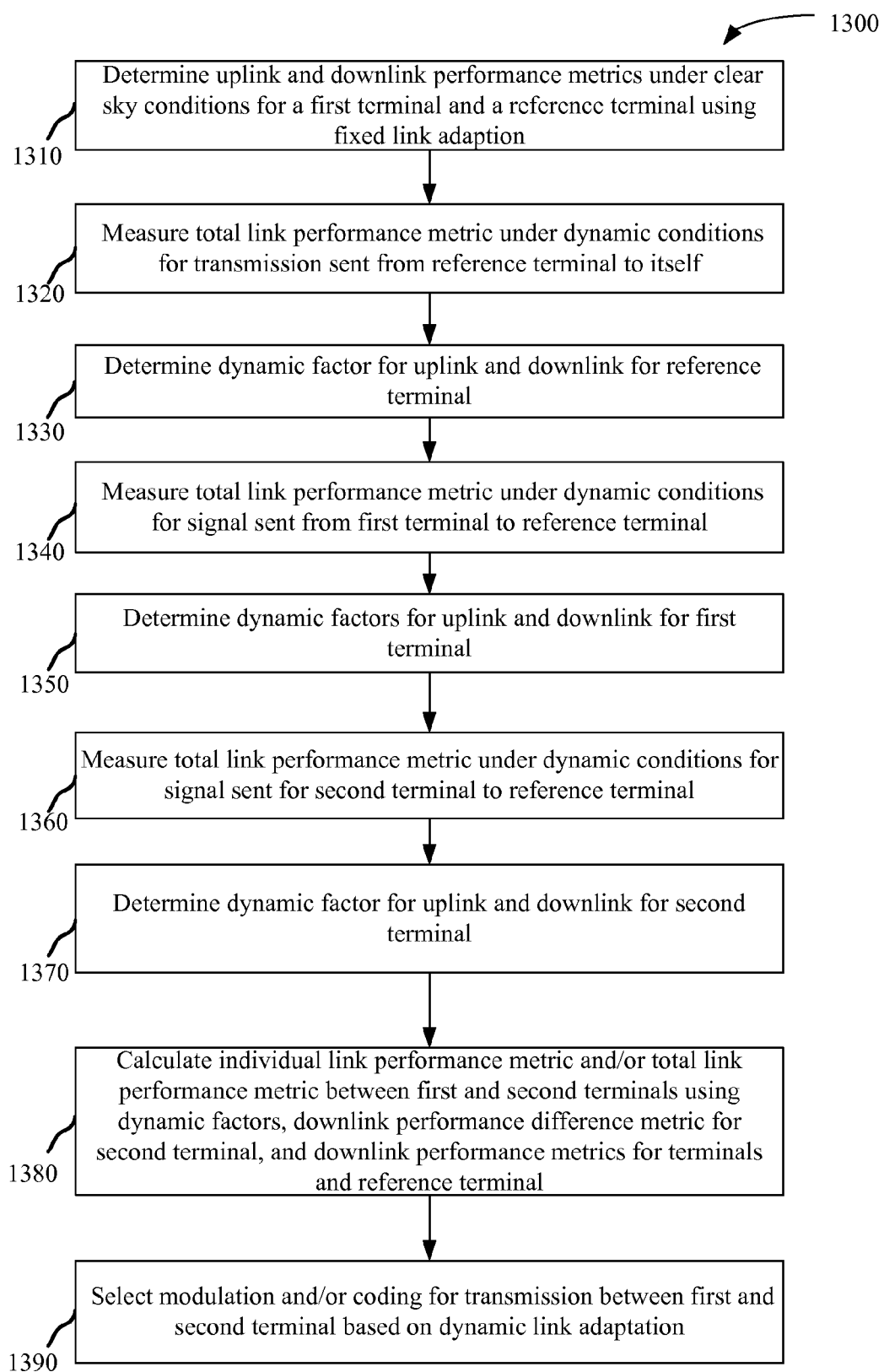
FIG. 13 is a flow diagram of a method of dynamic link adaptation, in accordance with various embodiments.

FIG. 13 provides one embodiment of a method 1300 of performing DLA, which may be implemented on a system such as system 100 of FIG. 1. At block 1310, measures of uplink and downlink performance are determined under clear sky conditions for a first terminal and a second terminal using an embodiment of FLA. At block 1320, a total link or round trip performance metric, such as a C/N, is measured under non-clear and/or dynamic sky conditions, such as rain fade conditions, for a transmission sent from a reference terminal to itself via a satellite. At block 1330, dynamic factors for uplink and downlink for the reference terminal are determined. In some embodiments, the dynamic factors may be rain fade factors. At block 1340, a total link or one-way link performance metric, such as a C/N, is measured under non-clear sky and/or dynamic conditions, such as rain fade conditions, for a transmission sent from a first terminal to the reference terminal via a satellite. At block 1350, dynamic factors for uplink and downlink for a first terminal are determined. In some embodiments, the dynamic factors may be rain fade factors. Block 1360 and 1370 parallel blocks 1340 and 1350, but relate to a second terminal. At block 1380, individual and/or total link performance metrics are calculated between the first and second terminals using the dynamic factors determined above, along with link performance difference metrics for terminals, and the FLA determined uplink and downlink performance measures determined at block 1310 for the terminals, including the reference terminal. At block 1390, modulation and coding may then be decided for signals sent between the terminals based on measures of link performance determined in the previous blocks.

The previous description provides exemplary embodiments only, and is not intended to limit the scope, applicability, or configuration of the disclosure. Rather, the previous description of the exemplary embodiments will provide those skilled in the art with an enabling description for implementing one or more exemplary embodiments. It is understood that various changes may be made in the function and arrangement of elements without departing from the spirit and scope of the invention. Several embodiments were described herein, and while various features are ascribed to different embodiments, it should be appreciated that the features described with respect to one embodiment may be incorporated within other embodiments as well. By the same token, however, no single feature or features of any described embodiment should be considered essential to every embodiment of the invention, as other embodiments of the invention may omit such features.

Specific details are given in the previous description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have also included additional steps or operations not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

While detailed descriptions of one or more embodiments have been give above, various alternatives, modifications, and equivalents will be apparent to those skilled in the art without varying from the spirit of the invention. Moreover, except where clearly inappropriate or otherwise expressly noted, it should be assumed that the features, devices, and/or components of different embodiments may be substituted and/or combined. Thus, the above description should not be taken as limiting the scope of the invention.

What is claimed is:

1. A method for determining link performance metrics for terminals in a satellite communication network, the method comprising:

identifying a first round trip link performance metric from a first terminal via a satellite back to the first terminal under clear sky conditions;

identifying a second round trip link performance metric from a reference terminal via the satellite back to the reference terminal under clear sky conditions;

identifying a first one-way link performance metric from the first terminal to the reference terminal via the satellite under clear sky conditions;

identifying a second one-way link performance metric from the reference terminal to the first terminal via the satellite under clear sky conditions;

identifying a third one-way link performance metric from the reference terminal to the first terminal via the satellite under dynamic conditions;

identifying a fourth one-way link performance metric from the first terminal to the reference terminal via the satellite under dynamic conditions;

identifying a fifth one-way link performance metric from a second terminal to the reference terminal via the satellite under clear sky conditions;

identifying a sixth one-way link performance metric from the reference terminal to the second terminal via the satellite under clear sky conditions;

identifying a seventh one-way link performance metric from the second terminal to the reference terminal via the satellite under dynamic conditions;

determining a first difference between a known link performance metric for the first terminal and a known link performance metric for the reference terminal;

determining a second difference between a known link performance metric for the second terminal and a known link performance metric for the reference terminal;

calculating at least one first terminal-to-satellite performance metric utilizing the plurality of identified round trip link performance metrics, the plurality of identified one-way link performance metrics, and the first difference;

calculating at least one second terminal-to-satellite performance metric utilizing the plurality of identified round trip link performance metrics, the plurality of identified one-way link performance metrics, and the second difference;

calculating a first dynamic link factor for the reference terminal based on the identified third one-way link performance metric and the link performance metrics identified under clear sky conditions;

calculating a second dynamic link factor for the first terminal based on the identified fourth one-way link performance metric and the link performance metrics identified under clear sky conditions;

calculating a third dynamic link factor for the second terminal based on the identified seventh one-way link performance metric and the link performance metrics identified under clear sky conditions; and calculating a third round trip link performance metric between the first terminal and the second terminal utilizing the dynamic link factors.

2. The method of claim 1, wherein identifying the performance metrics comprises identifying at least one link performance metric using at least one communication burst that is part of regular communication between terminals.

3. The method of claim 2, wherein using the at least one communication burst that is part of regular communication between terminals comprises using at least a reference burst from the reference terminal, a control burst from the first terminal, or a signal burst from the first terminal.

4. The method of claim 1, further comprising determining at least a modulation or a coding for a signal sent from at least one of the terminals based on at least one of the terminal-to-satellite performance metrics.

5. The method of claim 1, further comprising:

calculating an eighth one-way link performance metric from the first terminal to the second terminal via the satellite using a plurality of terminal-to-satellite performance metrics and the second difference.

6. The method of claim 1, wherein calculating the at least one first terminal-to-satellite link performance metric comprises calculating at least an uplink performance metric for the first terminal, an uplink performance metric for the reference terminal, a downlink performance metric for the first terminal, or a downlink performance metric for the reference terminal.

7. The method of claim 1, further comprising determining at least a modulation or a coding for a signal sent from the first terminal to the second terminal utilizing the third round trip link performance metric.

8. The method of claim 1, wherein calculating at least one of the dynamic link factors comprises calculating a rain fade factor.

9. A satellite communication system configured to determine link performance metrics for terminals in a satellite communication system, the system comprising:

a plurality of terminals; and a control center in communication with at least a subset of the terminals, wherein the control center is configured to:

identify a first round trip link performance metric from a first terminal via a satellite back to the first terminal under clear sky conditions;

identify a second round trip link performance metric from a reference terminal via the satellite back to the reference terminal under clear sky conditions;

identify a first one-way link performance metric from the first terminal to the reference terminal via the satellite under clear sky conditions;

identify a second one-way link performance metric from the reference terminal to the first terminal via the satellite under clear sky conditions;

identify a third one-way link performance metric from the reference terminal to the first terminal via the satellite under dynamic conditions;

identify a fourth one-way link performance metric from the first terminal to the reference terminal via the satellite under dynamic conditions;

identify a fifth one-way link performance metric from a second terminal to the reference terminal via the satellite under clear sky conditions;

identify a sixth one-way link performance metric from the reference terminal to the second terminal via the satellite under clear sky conditions;

identify a seventh one-way link performance metric from the second terminal to the reference terminal via the satellite under dynamic conditions;

determine a first difference between a known link performance metric for the first terminal and a known link performance metric for the reference terminal;

determine a second difference between a known link performance metric for the second terminal and a known link performance metric for the reference terminal;

calculate at least one first terminal-to-satellite performance metric utilizing the plurality of identified round trip link performance metrics, the plurality of identified one-way link performance metrics, and the first difference;

calculate at least one second terminal-to-satellite performance metric utilizing the plurality of identified round trip link performance metrics, the plurality of identified one-way link performance metrics, and the second difference;

calculate a first dynamic link factor for the reference terminal based on the identified third one-way link performance metric and the link performance metrics identified under clear sky conditions;

calculate a second dynamic link factor for the first terminal based on the identified fourth one-way link performance metric and the link performance metrics identified under clear sky conditions;

calculate a third dynamic link factor for the second terminal based on the identified seventh one-way link performance metric and the link performance metrics identified under clear sky conditions; and calculate a third round trip link performance metric between the first terminal and the second terminal utilizing the dynamic link factors.

10. The satellite communication system of claim 9, wherein the control center configured to identify the link performance metrics is configured to identify at least one of the link performance metrics using at least one communication burst that is part of regular communication between terminals.

11. The satellite communication system of claim 10, wherein the control center configured to use the at least one communication burst that is part of regular communication between terminals is configured to use at least a reference burst from the reference terminal, a control burst from the first terminal, or a signal burst from the first terminal.

12. The satellite communication system of claim 9, wherein the control center is further configured to determine at least a modulation or a coding for a signal sent from at least one of the terminals based on at least one of the terminal-to-satellite performance metrics.

13. The satellite communication system of claim 9, wherein the control center is further configured to:
calculate an eighth one-way link performance metric from the first terminal to the second terminal via the satellite using a plurality of terminal-to-satellite performance metrics and the second difference.

14. The satellite communication system of claim 9, wherein the control center configured to calculate the at least one first terminal-to-satellite link performance metric is configured to calculate at least an uplink performance metric for the first terminal, an uplink performance metric for the reference terminal, a downlink performance metric for the first terminal, or a downlink performance metric for the reference terminal.

15. The satellite communication system of claim 9, wherein the control center is further configured to determine at least a modulation or a coding for a signal sent from the first terminal to the second terminal utilizing the third round trip link performance metric.

16. The satellite communication system of claim 9, wherein the control center configured to calculate at least one of the dynamic link factors is configured to calculate a rain fade factor.

17. A satellite communication device configured to determine link performance metrics for terminals in a satellite communication network, the device comprising:
a receiver configured to receive link performance metrics for a plurality of terminals in the satellite communication network;
a processor configured to:
identify a first round trip link performance metric from a first terminal via a satellite back to the first terminal under clear sky conditions;
identify a second round trip link performance metric from a reference terminal via the satellite back to the reference terminal under clear sky conditions;
identify a first one-way link performance metric from the first terminal to the reference terminal via the satellite under clear sky conditions;
identify a second one-way link performance metric from the reference terminal to the first terminal via the satellite under clear sky conditions;
identify a third one-way link performance metric from the reference terminal to the first terminal via the satellite under dynamic conditions;
identify a fourth one-way link performance metric from the first terminal to the reference terminal via the satellite under dynamic conditions;
identify a fifth one-way link performance metric from a second terminal to the reference terminal via the satellite under clear sky conditions;
identify a sixth one-way link performance metric from the reference terminal to the second terminal via the satellite under clear sky conditions;
identify a seventh one-way link performance metric from the second terminal to the reference terminal via the satellite under dynamic conditions;
determine a first difference between a known link performance metric for the first terminal and a known link performance metric for the reference terminal;
determine a second difference between a known link performance metric for the second terminal and a known link performance metric for the reference terminal;
calculate at least one first terminal-to-satellite performance metric utilizing the plurality of identified round trip link performance metrics, the plurality of identified one-way link performance metrics, and the first difference;
calculate at least one second terminal-to-satellite performance metric utilizing the plurality of identified round trip link performance metrics, the plurality of identified one-way link performance metrics, and the second difference;
calculate a first dynamic link factor for the reference terminal based on the identified third one-way link performance metric and the link performance metrics identified under clear sky conditions;
calculate a second dynamic link factor for the first terminal based on the identified fourth one-way link performance metric and the link performance metrics identified under clear sky conditions;
calculate a third dynamic link factor for the second terminal based on the identified seventh one-way link performance metric and the link performance metrics identified under clear sky conditions; and calculate a third round trip link performance metric between the first terminal and the second terminal utilizing the dynamic link factors; and a transmitter configured to transmit information regarding link performance metrics into the satellite communication network.

18. The satellite communication device of claim 17, wherein the processor configured to identify link performance metrics is configured to identify at least one link performance metric using at least one communication burst that is part of regular communication between terminals.

19. The satellite communication device of claim 18, wherein the processor configured to use the at least one communication burst that is part of regular communication between terminals is configured to use at least a reference burst from the reference terminal, a control burst from the first terminal, or a signal burst from the first terminal.

20. The satellite communication device of claim 17, wherein the processor is further configured to determine at least a modulation or a coding for a signal sent from at least one of the terminals based on at least one of the terminal-to-satellite performance metrics.

21. The satellite communication device of claim 17, wherein the processor is further configured to:

calculate an eighth one-way link performance metric from the first terminal to the second terminal via the satellite using a plurality of terminal-to-satellite performance metrics and the second difference.

22. The satellite communication device of claim 17, wherein the processor configured to calculate the at least one first terminal-to-satellite link performance metric is configured to calculate at least an uplink performance metric for the first terminal, an uplink performance metric for the reference terminal, a downlink performance metric for the first terminal, or a downlink performance metric for the reference terminal.

23. The satellite communication device of claim 17, wherein the processor is further configured to determine at least a modulation or a coding for a signal sent from the first terminal to the second terminal utilizing the third round trip link performance metric.

24. The satellite communication device of claim 17, wherein the processor configured to calculate at least one of the dynamic link factors is configured to calculate comprises calculating a rain fade factor.

* * * * *